(12) United States Patent
Takahashi et al.

(10) Patent No.: US 10,610,784 B2
(45) Date of Patent: Apr. 7, 2020

(54) INFORMATION STORAGE MEDIUM AND GAME DEVICE

(71) Applicant: BANDAI NAMCO ENTERTAINMENT INC., Tokyo (JP)

(72) Inventors: Toru Takahashi, Tokyo (JP); Tadashi Iguchi, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 122 days.

(21) Appl. No.: 15/847,130

(22) Filed: Dec. 19, 2017

(65) Prior Publication Data

US 2018/0178126 A1    Jun. 28, 2018

(30) Foreign Application Priority Data

Dec. 28, 2016 (JP) .................. 2016-256529

(51) Int. Cl.
| | |
|---|---|
| *A63F 13/56* | (2014.01) |
| *A63F 13/52* | (2014.01) |
| *A63F 13/95* | (2014.01) |
| *A63F 13/80* | (2014.01) |
| *A63F 13/35* | (2014.01) |

(52) U.S. Cl.
CPC .............. *A63F 13/56* (2014.09); *A63F 13/35* (2014.09); *A63F 13/52* (2014.09); *A63F 13/80* (2014.09); *A63F 13/95* (2014.09)

(58) Field of Classification Search
CPC .......... A63F 13/56; A63F 13/35; A63F 13/52; A63F 13/80; A63F 13/95
See application file for complete search history.

(56) References Cited

U.S. PATENT DOCUMENTS 6,354,939 B1    3/2002  Morita et al.
2002/0094854 A1*  7/2002  Morita .................. A63F 13/10
463/9

FOREIGN PATENT DOCUMENTS

JP     H10165649 A    6/1998

OTHER PUBLICATIONS

Pac-Man—Wikipedia10272016.pdf, https://en.wikipedia.org/w/index.php?title=Pac-Man&oldid=746510881, published on Oct. 27, 2016 (Year: 2016).*
Guller et al.; "Jungler"; Jun. 28, 2014; Jul. 16, 2017.

* cited by examiner

*Primary Examiner* — William H McCulloch, Jr.
*Assistant Examiner* — Yingchuan Zhang
(74) *Attorney, Agent, or Firm* — Oliff PLC

(57) ABSTRACT

A non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto.

18 Claims, 12 Drawing Sheets

INFORMATION STORAGE MEDIUM AND GAME DEVICE

Japanese Patent Application No. 2016-256529, filed on Dec. 28, 2016, is hereby incorporated by reference in its entirety.

BACKGROUND OF THE INVENTION

The present invention relates to an information storage medium and a game device.

Games including battle elements in which a player chases or escapes from an enemy character through a maze provided on a game screen are available in the prior art. These types of games (referred to hereafter simply as "battle games") are simple and have a long history, and are therefore known to have many highly skilled players. In recent years, with the spread of social networking services (SNS), players typically enjoy playing either cooperatively or competitively with other players, and for this purpose, various types of games are equipped with a multiplayer mode.

Typically, however, the multiplayer mode of a battle game is a cooperative play mode rather than a competitive play mode, and therefore players have almost no opportunity to play directly against each other. Incidentally, a drop-down type puzzle game pre-equipped with a competitive play mode has been proposed (see JP-A-10-165649, for example), but a drop-down type puzzle game is inherently different to a battle game in that characters that can be operated by the player do not appear, and therefore the fun of a battle game may be lost if the competitive element of the drop-down puzzle game is incorporated as is into a battle game.

SUMMARY

The invention provides an information storage medium and a game device with which a multiplayer element for competing with another player can be added to a game that includes a battle element in which a player chases an enemy character through a maze and escapes from the enemy character through the maze in a home area, while maintaining the fun of a single player game for battling the enemy character.

According to a first aspect of the invention, there is provided a non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to function as:

a display control section that executes control for causing a display section to display a bird's-eye view image of the path within the first area;

an object control section that executes control for placing a first item that is beneficial to the game progress by the first player character on the path within the first area, control for causing an enemy character that inflicts given damage on the first player character to appear on the path within the first area, and moving the enemy character by a given algorithm, control for placing a second item that allows the first player character to come into contact with the enemy character on the path within the first area, control for setting the first area in a condition where the first player character can come into contact with the enemy character when the first player character satisfies a given contact condition with respect to the second item, and control for causing the enemy character, the first item, or the second item to disappear when the first player character satisfies a given contact condition with respect to the enemy characterin a contactable condition, the first item, or the second item;

a game calculation section that reflects a disappearance status of the enemy character or the first item in the first area on a parameter indicating a degree of the game progress by the first player character;

a determination section that executes processing for determining whether or not a given obstruction triggering condition has been established by the first player character moving along the path within the first area with respect to the enemy character, the first item, or the second item; and an event control section that executes control for generating, in the second area, an obstruction event for obstructing the game progress by the second player character, when the obstruction triggering condition is established in the first area.

According to a second aspect of the invention, there is provided a non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to function as:

a display control section that executes control for causing a display section to display bird's-eye view images of the path within the first area and a path within the second area;

an object control section that executes control for placing a first item that is beneficial to the game progress by the first player character on the path of the first area control for placing a first item that is beneficial to the game progress by the second player character on the path of the second area, control for causing an enemy character that inflicts given damage on the first player character to appear on the path within the first area, and moving the enemy character by a given algorithm, control for causing an enemy character that inflicts given damage on the second player character to appear on the path within the second area, and moving the enemy character by a given algorithm, control for placing a second item that allows the first player character to come into contact with the enemy character on the path within the first area, control for placing a second item that allows the second player character to come into contact with the enemy character on the path within the second area, control for setting the first area in a condition where the first player character can come into contact with the enemy character when the first player character satisfies a given contact condition with respect to the second item, control for setting the second area in a condition where the second player character can come into contact with the enemy character when the second player character satisfies a given contact condition with respect to the second item, control for causing the enemy character, the first item, or the second item to disappear when the first player character satisfies a given contact condition with respect to the enemy character in a contactable condition, the first item, or the second item and control for causing the enemy character, the first item, or the second item to disappear when the second player character satisfies a given contact condition with respect to the enemy character in a contactable condition, the first item, or the second item;

a game calculation section that executes control for reflecting a disappearance status of the enemy character or the first item in the first area on a parameter that indicates a degree of the game progress by the first player character, and control for reflecting a disappearance status of the enemy character or the first item in the second area on a parameter that indicates a degree of the game progress by the second player character;

a determination section that executes processing for determining whether or not a given obstruction triggering condition has been established by the first player character moving along the path within the first area with respect to the enemy character, the first item, or the second item, and processing for determining whether or not a given obstruction triggering condition has been established by the second player character moving along the path within the second area with respect to the enemy character, the first item, or the second item; and an event control section that executes control for generating, in the second area, an obstruction event for obstructing the game progress by the second player character, when the obstruction triggering condition is established in the first area, and control for generating, in the first area, an obstruction event for obstructing the game progress by the first player character, when the obstruction triggering condition is established in the second area.

According to a third aspect of the invention, there is provided a game device that executes a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the game device including:

a display control section that executes control for causing a display section to display a bird's-eye view image of the path within the first area;

an object control section that executes control for placing a first item that is beneficial to the game progress by the first player character on the path within the first area, control for causing an enemy character that inflicts given damage on the first player character to appear on the path within the first area, and moving the enemy character by a given algorithm, control for placing a second item that allows the first player character to come into contact with the enemy character on the path within the first area, control for setting the first area in a condition where the first player character can come into contact with the enemy character when the first player character satisfies a given contact condition with respect to the second item, and control for causing the enemy character, the first item, or the second item to disappear when the first player character satisfies a given contact condition with respect to the enemy character in a contactable condition, the first item, or the second item;

a game calculation section that reflects a disappearance status of the enemy character or the first item in the first area on a parameter indicating a degree of the game progress by the first player character;

a determination section that executes processing for determining whether or not a given obstruction triggering condition has been established by the first player character moving along the path within the first area with respect to the enemy character, the first item, or the second item; and an event control section that executes control for generating, in the second area, an obstruction event for obstructing the game progress by the second player character, when the obstruction triggering condition is established in the first area.

Figure 1:
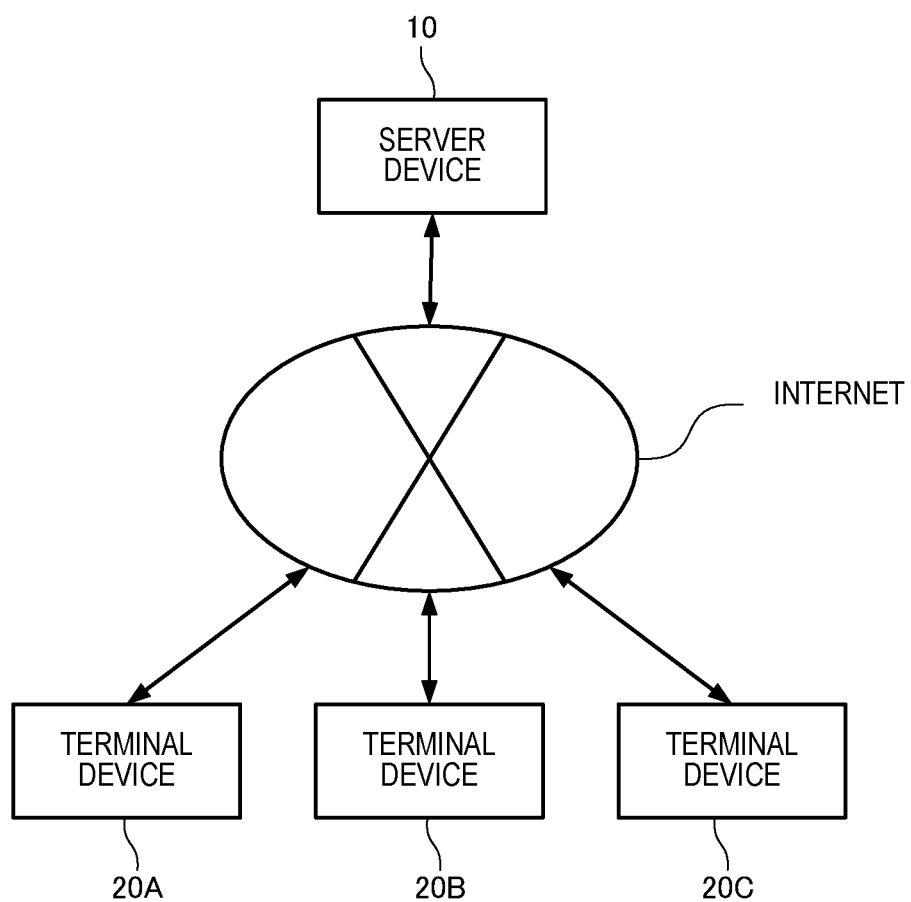
FIG. 1 is a diagram illustrating an example of a configuration of a game system according to one embodiment of the invention.

DETAILED DESCRIPTION OF THE EMBODIMENT (1) According to one embodiment of the invention, there is provided a non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to function as:

a display control section that executes control for causing a display section to display a bird's-eye view image of the path within the first area;

an object control section that executes control for placing a first item that is beneficial to the game progress by the first player character on the path within the first area, control for causing an enemy character that inflicts given damage on the first player character to appear on the path within the first area, and moving the enemy character by a given algorithm, control for placing a second item that allows the first player character to come into contact with the enemy character on the path within the first area, control for setting the first area in a condition where the first player character can come into contact with the enemy character when the first player character satisfies a given contact condition with respect to the second item, and control for causing the enemy character, the first item, or the second item to disappear when the first player character satisfies a given contact condition with respect to the enemy character in a contactable condition, the first item, or the second item;

a game calculation section that reflects a disappearance status of the enemy character or the first item in the first area on a parameter indicating a degree of the game progress by the first player character;

a determination section that executes processing for determining whether or not a given obstruction triggering condition has been established by the first player character moving along the path within the first area with respect to the enemy character, the first item, or the second item; and an event control section that executes control for generating, in the second area, an obstruction event for obstructing the game progress by the second player character, when the obstruction triggering condition is established in the first area.

According to the above configuration, when the given obstruction triggering condition is established between the first player character moving along the path through the first area and the enemy character or an item, an obstruction event is generated in the second area. Hence, even though the path of the first player character and the path of the second player character are allocated to different areas, the first player character has the ability to interfere with the second player character.

Moreover, basically, the first player can control the timing at which the obstruction event is generated indirectly by controlling a movement pattern of the first player character, and therefore the first player has the ability to advance his/her own progress through the game while acting in parallel to obstruct the other player without the need to execute complicated operations. Hence, according to the configuration described above, a multiplayer element for competing with a second player can be added to a game that includes a battle element in which a first player chases an enemy character through a maze and escapes from the enemy character through the maze in a home area, while maintaining the fun of a single player game for battling the enemy character.

(2) In the above information storage medium, the display control section may display the bird's-eye view image of the path within the first area and a bird's-eye view image of a path within the second area side by side on the same display section.

Hence, the first player can set an obstruction at an appropriate timing while checking the play of the second player.

(3) In the above information storage medium, the determination section may determine whether or not at least one of the following conditions is satisfied as the given obstruction triggering condition:

the enemy character, the first item, or the second item has been caused to disappear;

the number of disappearances of the enemy character, the first item, or the second item has reached a predetermined number;

a disappearance timing of the enemy character, the first item, or the second item is a predetermined timing; and damage inflicted on the enemy character has reached a predetermined value.

According to this configuration, the first player can decide whether or not to generate an obstruction event in the second area or adjust the timing at which the obstruction event is generated by controlling at least one of the disappearance of the enemy character or an item from the first area, the number of disappearances of the enemy character or the item, the disappearance timing of the enemy character or the item, and the damage inflicted on the enemy character.

(4) In the above information storage medium, the determination section may determine whether or not the number of disappearances of the enemy character, the first item, or the second item has reached the predetermined number as the given obstruction triggering condition, and execute control for calculating a degree of achievement of the given obstruction triggering condition every time the enemy character, the first item, or the second item disappears, and displaying a visual effect representing the degree of achievement on the display section.

According to this configuration, the first player or the second player can intuitively recognize the number of disappearances remaining until the obstruction event is generated on the basis of the visual effect (a gauge, a graph, a virtual meter, or the like) displayed on the display section.

(5) In the above information storage medium, the determination section may vary an increase in the degree of achievement, when calculating the degree of achievement, in accordance with a type or a condition of the enemy character, the first item, or the second item.

According to this configuration, the first player can be provided with a motive for actively causing the enemy character or an item that is more advantageous in terms of generating the obstruction event to disappear.

(6) In the above information storage medium, the event control section may generate at least one of the following events as the obstruction event:

introducing an obstruction object into the second area;

increasing or reducing the number of enemy characters or items already existing in the second area;

altering an enemy character or an item already existing in the second area;

modifying a layout of virtual walls in the second area; and altering the second player character.

According to this configuration, by establishing the given obstruction triggering condition, the first player can generate, as the obstruction event, at least one of introducing an obstruction object into the second area, increasing or reducing the number of enemy characters or items already existing in the second area, altering the type or condition of the enemy character or an item already existing in the second area, modifying the layout of the virtual walls in the second area, and altering the condition of the second player character. Note that the obstruction event may include another well-known obstruction event. For example, the visibility of the second area to the second player may be obstructed. The visibility can be obstructed by darkening the screen, causing the screen to flash, applying a partial mask to the screen, and so on.

(7) In the above information storage medium, the event control section may introduce an obstruction object into the second area as the obstruction event, and the obstruction object may include at least one of:

an enemy character that inflicts given damage on the second player character;

an object that inflicts given damage on the path; and a blocking object that obstructs passage along the path.

According to this configuration, the first player can introduce at least one of an enemy character that inflicts given damage on the second player character, an object that inflicts given damage on the path, and a blocking object that obstructs passage of the second player character along the path into the second area as the obstruction object.

(8) In the above information storage medium, the event control section may introduce the obstruction object toward an area in which the second player character exists.

According to this embodiment, the first player can introduce the obstruction object into an area of the second area that is particularly disadvantageous to the second player.

(9) In the above information storage medium, the event control section may link the obstruction object to movement of the first player character.

According to this configuration, the first player can control the movement of the obstruction object indirectly by controlling the movement of the first player character when the given obstruction triggering condition is established. As a result, the first player can use strategy to outmaneuver the second player.

(10) In the above information storage medium, the event control section may introduce the obstruction object toward a predetermined area within the second area.

According to this configuration, the obstruction object is introduced automatically toward a predetermined area of the second area. The predetermined area is an area of the second area where the enemy character is waiting, a warp point, or the like, for example. Warp points in the second area are locations disposed at a remove from each other within the second area, where the player character is moved instantaneously to another location.

(11) In the above information storage medium, the event control section may introduce the obstruction object in response to operation input by the first player.

According to this configuration, the first player can manipulate introduction of the obstruction object into the second area. For example, the first player can be allowed to manipulate at least one of an introduction destination, an introduction angle, and an introduction timing at which the obstruction object is introduced into the second area.

(12) In the above information storage medium, the event control section may limit a reception period for the operation input to a predetermined period following establishment of the given obstruction triggering condition.

According to this configuration, the first player can be prompted to specify the introduction destination of the obstruction object as quickly as possible. Furthermore, when a touch panel or the like is used for the operation input, the reception period is preferably limited to ensure that the operation input can be differentiated from other operation input.

(13) In the above information storage medium, the event control section may link the obstruction object to movement of the second player character.

According to this configuration, the obstruction object chases the second player character, and therefore the second player character must move continuously or execute avoidance operations such as attracting the obstruction object and then suddenly switching direction to reduce the likelihood of contact with the obstruction object.

(14) In the above information storage medium, the event control section may set the number of obstruction objects to be steadily higher as the number of enemy characters, first items, or second items caused to disappear by the first player character in order to establish the given obstruction triggering condition increases.

According to this configuration, a power difference between the first player character and the second player character increases steadily as the number of enemy characters or first items caused to disappear by the first player character increases, and as a result, the competitiveness of the game can be improved.

(15) In the above information storage medium, the event control section may set a type of the obstruction object in accordance with the type of the enemy character or the item caused to disappear by the first player character in order to establish the given obstruction triggering condition.

Hence, the first player can select the type of obstruction object to be introduced indirectly by selecting the type of enemy character or item to be caused to disappear.

(16) In the above information storage medium, the event control section may set the introduction timing of the obstruction object in accordance with a timing at which the given obstruction triggering condition is established.

Hence, the first player can control the introduction timing of the obstruction object indirectly by controlling the timing at which the given obstruction triggering condition is established. Further, by establishing the given obstruction triggering condition continuously, the first player can introduce obstruction objects continuously.

(17) According to one embodiment of the invention, there is provided a non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to function as:

a display control section that executes control for causing a display section to display a bird's-eye view images of the path within the first area and a path within the second area;

an object control section that executes control for placing a first item that is beneficial to the game progress by the first player character on the path within the first area, control for placing a first item that is beneficial to the game progress by the second player character on the path within the second area, control for causing an enemy character that inflicts given damage on the first player character to appear on the path within the first area, and moving the enemy character by a given algorithm, control for causing an enemy character that inflicts given damage on the second player character to appear on the path within the second area, and moving the enemy character by a given algorithm, control for placing a second item that allows the first player character to come into contact with the enemy character on the path within the first area, control for placing a second item that allows the second player character to come into contact with the enemy character on the path within the second area, control for setting the first area in a condition where the first player character can come into contact with the enemy character when the first player character satisfies a given contact condition with respect to the second item, control for setting the second area in a condition where the second player character can come into contact with the enemy character when the second player character satisfies a given contact condition with respect to the second item, control for causing the enemy character, the first item, or the second item to disappear when the first player character satisfies a given contact condition with respect to the enemy character in a contactable condition, the first item, or the second item, and control for causing the enemy character, the first item, or the second item to disappear when the second player character satisfies a given contact condition with respect to the enemy character in a contactable condition, the first item, or the second item;

a game calculation section that executes control for reflecting a disappearance status of the enemy character or the first item in the first area on a parameter that indicates a degree of the game progress by the first player character, and control for reflecting a disappearance status of the enemy character or the first item in the second area on a parameter that indicates a degree of the game progress by the second player character;

a determination section that executes processing for determining whether or not a given obstruction triggering condition has been established by the first player character moving along the path within the first area with respect to the enemy character, the first item, or the second item, and processing for determining whether or not a given obstruction triggering condition has been established by the second player character moving along the path within the second area with respect to the enemy character, the first item, or the second item; and an event control section that executes control for generating, in the second area, an obstruction event for obstructing the game progress by the second player character, when the obstruction triggering condition is established in the first area, and control for generating, in the first area, an obstruction event for obstructing the game progress by the first player character, when the obstruction triggering condition is established in the second area.

According to this configuration, when a given obstruction triggering condition is established between the first player character moving along the path of the first area and the enemy character or an item, an obstruction event is generated in the second area, and when a given obstruction triggering condition is established between the second player character moving along the path of the second area and the enemy character or an item, an obstruction event is generated in the first area. Hence, even though the path of the first player character and the path of the second player character are allocated to different areas, the first player character and the second player character have the ability to interfere with each other.

Moreover, basically, the first player can control the timing at which the obstruction event is generated indirectly by controlling the movement pattern of the first player character, and the second player can control the timing at which the obstruction event is generated indirectly by controlling the movement pattern of the second player character. Therefore, the first player and the second player each have the ability to advance their own progress through the game while acting in parallel to obstruct the other player without the need to execute complicated operations. Hence, according to the configuration described above, a multiplayer element for competing with an opponent player can be added to a game that includes a battle element in which a first player and a second player chase an enemy character through a maze and escape from the enemy character through the maze in respective home areas thereof, while maintaining the fun of a single player game for battling the enemy character.

(18) According to one embodiment of the invention, there is provided a game device that executes a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the game device including:

a display control section that executes control for causing a display section to display a bird's-eye view image of the path within the first area;

an object control section that executes control for placing a first item that is beneficial to the game progress by the first player character on the path within the first area, control for causing an enemy character that inflicts given damage on the first player character to appear on the path within the first area, and moving the enemy character by a given algorithm, control for placing a second item that allows the first player character to come into contact with the enemy character on the path within the first area, control for setting the first area in a condition where the first player character can come into contact with the enemy character when the first player character satisfies a given contact condition with respect to the second item, and control for causing the enemy character, the first item, or the second item to disappear when the first player character satisfies a given contact condition with respect to the enemy character in a contactable condition, the first item, or the second item;

a game calculation section that reflects a disappearance status of the enemy character or the first item in the first area on a parameter indicating a degree of the game progress by the first player character;

a determination section that executes processing for determining whether or not a given obstruction triggering condition has been established by the first player character moving along the path within the first area with respect to the enemy character, the first item, or the second item; and an event control section that executes control for generating, in the second area, an obstruction event for obstructing the game progress by the second player character, when the obstruction triggering condition is established in the first area.

According to the above configuration, when the given obstruction triggering condition is established between the first player character moving along the path of the first area and the enemy character or an item, an obstruction event is generated in the second area. Hence, even though the path of the first player character and the path of the second player character are allocated to different areas, the first player character has the ability to interfere with the second player character.

Moreover, basically, the first player can control the timing at which the obstruction event is generated indirectly by controlling a movement pattern of the first player character, and therefore the first player has the ability to advance his/her own progress through the game while acting in parallel to obstruct the other player without the need to execute complicated operations. Hence, according to the configuration described above, a multiplayer element for competing with a second player can be added to a game that includes a battle element in which a first player chases an enemy character through a maze and escapes from the enemy character through the maze in a home area, while maintaining the fun of a single player game for battling the enemy character.

Note that some or all of the functions of the game device according to the invention may be realized by a server device and a terminal device. Further, all or a part of the program according to the invention may be recorded on an information storage medium.

An embodiment will be described below. Note that the embodiment described below does not in any way limit the scope of the invention defined by the claims laid out herein. Note also that all of the elements described below in connection with the exemplary embodiments should not necessarily be taken as essential elements of the invention.

1. Game System

First, an outline and a schematic configuration of a game system 1 according to this embodiment will be described using FIG. 1. Note that FIG. 1 is a diagram illustrating an example of the configuration of the game system 1 according to this embodiment.

As illustrated in FIG. 1, the game system 1 according to this embodiment is configured so that a server device 10 that provides a game service and a terminal device 20 (terminal devices 20A, 20B, and 20C, for example) can be connected to the Internet (an example of a network).

A user (a player) can access the server device 10 from the terminal device 20 through the Internet, and play a game transmitted from the server device 10 through the Internet. The player can also communicate with another player by accessing the server device 10 from the terminal device 20.

The server device 10 is an information processing device capable of providing a service that allows the player to play the game using the terminal device 20, which is connected communicably to the server device 10 through the Internet. The server device 10 may also function as an SNS server that provides a communication type service. Here, the SNS server may be an information processing device that provides a service that allows a plurality of players to communicate with each other.

Further, when the server device 10 functions as an SNS server, for example, the server device 10 can provide a game known as a social game that is executed using an operating environment (an application programming interface (API), a platform, or the like) of an SNS provided thereby.

The server device 10 can also provide a game that is provided on a web browser of the terminal device 20, for example a browser game (a game that starts as soon as the user opens a website on which the game is installed using the web browser) created in various languages such as HTML, FLASH, CGI, PHP, shockwave, Java (registered trademark) applet, or JavaScript (registered trademark), for example.

Note that a social game differs from an existing online game in including games that do not require dedicated client software and can be played using only a web browser and an SNS account. Further, the server device 10 has a configuration which enables to provide an online game in which a terminal (a smartphone, a personal computer, a game device, or the like) connects to a terminal of another player through a network, and the terminals play the same game at the same time online so as to share the progress of the game.

The server device 10 may be constituted by a single device or processor, or a plurality of devices or processors.

Information such as billing information and game information stored in a storage area (a storage section 140 to be described below) of the server device 10 may be stored in a database (in a broad sense, a storage device or a memory) that is connected to the server device 10 through a network (an intranet or the Internet). When the server device 10 functions as an SNS server, information such as user information 146 stored in the storage area may be stored in a database (in a broad sense, a storage device or a memory) that is connected to the server device 10 through a network (an intranet or the Internet).

More specifically, the server device 10 according to this embodiment receives input information based on an operation performed on the terminal device 20 by the player (i.e. the player who plays the game), and performs game processing based on the received input information. The server device 10 transmits a game processing result to the terminal device 20, and the terminal device 20 performs various types of processing for providing the player with the game processing result received from the server device 10 in a viewable form.

The terminal device 20 is an information processing device such as a smartphone, a mobile phone, a PHS, a computer, a game device, a PDA, a portable game machine, an image generation device, or the like, which can connect to the server device 10 through a network such as the Internet (WAN) or a LAN. Note that a communication line between the terminal device 20 and the server device 10 may be wired or wireless.

Further, the terminal device 20 is provided with a web browser that allows the player to view a web page (HTML format data). More specifically, the terminal device 20 has a communication control function for communicating with the server device 10, a web browser function for implementing display control using data (web data, data created in an HTML format, and so on) received from the server device 10, and transmitting data representing an operation performed by the player to the server device 10, and so on. The terminal device 20 executes various types of processing for providing a game screen to the player, and allows the player to play the game. Note that the terminal device 20 may acquire game control information provided by the server device 10, and execute predetermined game processing to execute a game based on the game processing.

Specifically, when the terminal device 20 issues a request to play a predetermined game to the server device 10, the terminal device 20 is connected to the game website provided by the server device 10, whereupon the game starts. More specifically, the terminal device 20 has a configuration which enables to execute the game by utilizing the API as required either to cause the server device 10 functioning as an SNS server to perform predetermined processing or to acquire the user information 146 managed by the server device 10 functioning as an SNS server.

2. Server Device

Figure 2:
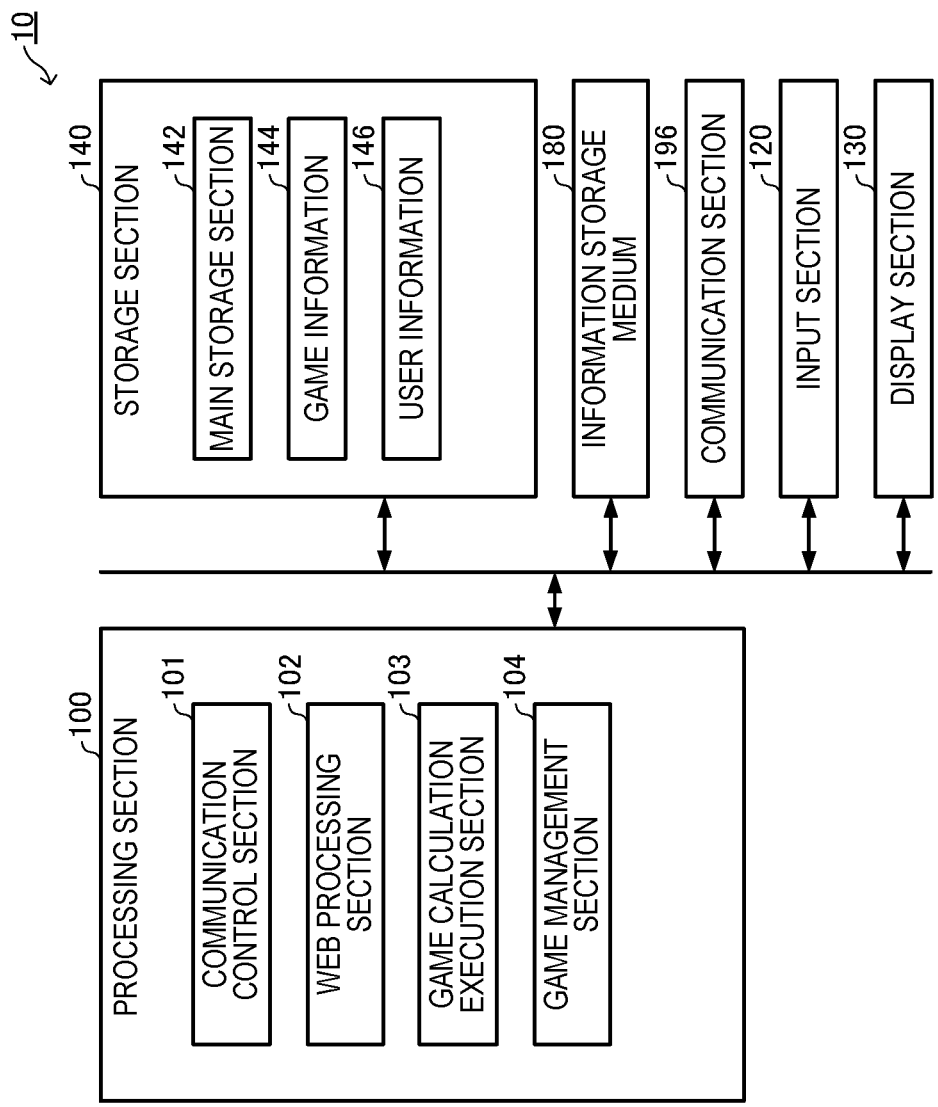
FIG. 2 is a functional block diagram illustrating an example of a configuration of a server device.

Next, the server device 10 according to this embodiment will be described using FIG. 2. Note that FIG. 2 is a functional block diagram illustrating the server device 10 according to this embodiment. Further, the server device 10 according to this embodiment may be configured such that some of the constituent elements (sections) shown in FIG. 2 are omitted.

The server device 10 includes an input section 120 used for input by an administrator and so on, a display section 130 for implementing predetermined display, an information storage medium 180 storing predetermined information, a communication section 196 that communicates with the terminal device 20 and so on, a processing section 100 that mainly executes processing relating to the game provided by the server device 10, and the storage section 140 that mainly stores various types of data used in the game.

The input section 120 allows a system administrator or the like to input game settings, other necessary settings, and data. The input section 120 according to this embodiment is constituted by a mouse, a keyboard, or the like, for example.

The display section 130 displays an operation screen used by the system administrator. The display section 130 according to this embodiment is constituted by a liquid crystal display or the like, for example.

The information storage medium 180 (a computer-readable medium) stores a program, data, and the like. A function of the information storage medium 180 is realized by an optical disk (a CD or a DVD), a magneto-optical disk (an MO), a magnetic disk, a hard disk, magnetic tape, a memory (a ROM), or the like.

The communication section 196 performs various types of control for communicating with the outside (for example, a terminal, another server, or another network system). A function of the communication section 196 is realized by hardware such as various types of processors or a communication ASIC, a program, or the like.

The storage section 140 serves as a work area for the processing section 100, the communication section 196, and so on. A function of the storage section 140 is realized by a RAM (a VRAM) or the like. Note that the information stored in the storage section 140 may be managed using a database.

Furthermore, in this embodiment, the storage section 140 stores game information 144 representing information relating to the provided game, the user information 146 representing information relating to the player who plays the provided game, and various other types of information necessary for game calculations.

The processing section 100 performs various types of processing using a main storage section 142 included in the storage section 140 as a work area. A function of the processing section 100 can be realized by hardware such as various types of processors (a CPU, a DSP, or the like) or an ASIC (a gate array or the like), or a program.

The processing section 100 performs various types of processing according to this embodiment on the basis of the program (data) stored in the information storage medium 180. In other words, a program that causes a computer to function as the respective sections of this embodiment (a program that causes a computer to execute the processing implemented by the respective sections) is stored in the information storage medium 180.

For example, the processing section 100 (a processor) performs various types of processing for controlling the entire server device 10, controlling the transfer of data and so on between sections, and the like on the basis of the program stored in the information storage medium. The processing section 100 also performs processing for providing various services in response to requests from the terminal device 20.

More specifically, the processing section 100 according to this embodiment includes at least a communication control section 101, a web processing section 102, and a game management section 104.

The communication control section 101 performs processing for exchanging data with the terminal device 20 through a network. More specifically, the server device 10 performs various types of processing on the basis of information received by the communication control section 101 from the terminal device 20 and the like.

The communication control section 101 according to this embodiment in particular performs processing for transmitting a game screen to the terminal device 20 of the player on the basis of a request from the terminal device 20 of the player.

The web processing section 102 functions as a web server. For example, the web processing section 102 performs processing for transmitting data in response to a request from the web browser installed in the terminal device 20 by means of a communication protocol such as Hypertext Transfer Protocol (HTTP), and performs processing for receiving data transmitted by the web browser installed in the terminal device 20.

Note that in this embodiment, an example of a case in which the server device 10 also functions as an SNS server will be described, but the server device 10 may be formed from a game server and an SNS server that are provided separately. Moreover, the game processing according to this embodiment may be implemented partially or entirely by the server device 10, and partially or entirely by the terminal device 20.

The game management section 104 executes game processing relating to a role-playing game (RPG) or a battle game played by each player in conjunction with the terminal device 20 on the basis of operations input by the player via the terminal device 20, and manages the user information 146, which includes a progress status of the game played by each player and item management information such as a character and various items used by each player.

Note that the game management section 104 may execute automatic calculation processing for executing the game automatically on the basis of various types of data set by the player instead of operations performed by the player in order to generate data used by the terminal device 20 to reproduce the game, and provide the generated data to the terminal device 20.

3. Terminal Device

Figure 3:
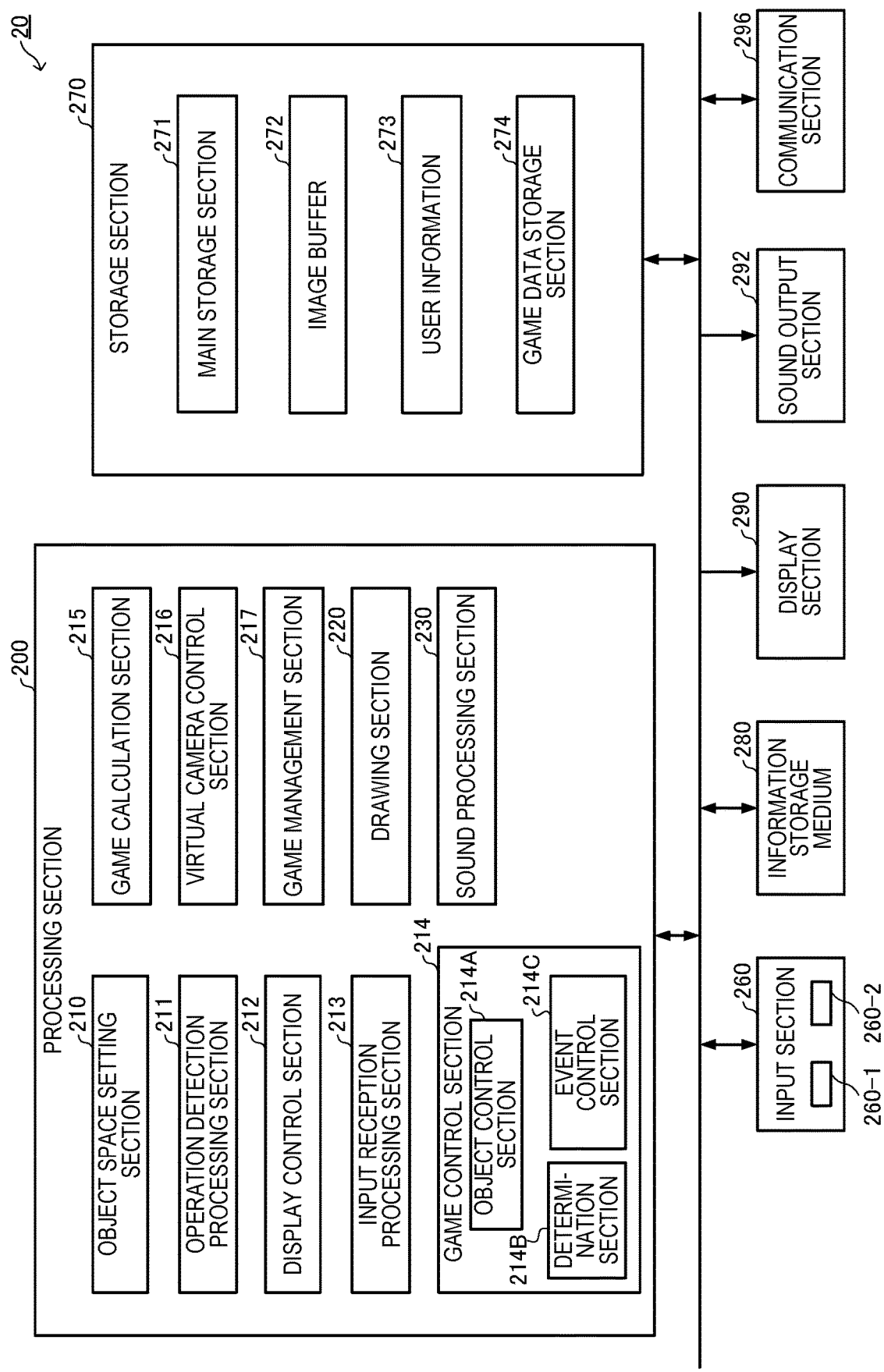
FIG. 3 is a functional block diagram illustrating an example of a configuration of a terminal device.

Next, the terminal device 20 according to this embodiment will be described using FIG. 3. Note that FIG. 3 is a functional block diagram illustrating an example of the configuration of the terminal device according to this embodiment. Also note that the terminal device 20 according to this embodiment may have a configuration in which some of the constituent elements (sections) shown in FIG. 3 are omitted.

An input section 260 allows the player to input an operation instruction for operating a character. A function of the input section 260 may be realized using a controller formed in the real space in which the player inputs an operation instruction, such as a four-way key, a joystick, a steering wheel, a keyboard, or a touch panel, or a device formed in a real space, such as a lever, a handle, a button, or a card and a field board that recognizes a position and a type of the card. Note that at least part of the input section 260 may be constituted by a virtual controller displayed on a display screen such as a touch panel. When the user performs an operation (a touch operation or the like) on the virtual controller, the input section 260 serving as the virtual controller generates a signal that corresponds to the content of the operation performed by the user, and transmits the signal to a processing section 200. Note that the virtual controller is moved over the touch panel by a game control section 214, a display control section 212, or the like, for example.

The input section 260 may further include an acceleration sensor, a sightline detection sensor, and so on. When a display section 290 is constituted by an HMD in particular, the input section 260 is used to implement processing for detecting a head orientation, a sightline direction, or the like of the player in conjunction with the display section 290, and displaying an image of a game space based on the viewpoint of the player on the display section 290.

A storage section 270 serves as a work area for the processing section 200, a communication section 296, and so on, and a function thereof may be realized by a RAM (a VRAM) or the like. The storage section 270 according to this embodiment includes a main storage section 271 that is used as a work area, an image buffer 272 that stores a final display image and so on, user information 273 representing information relating to the player who plays the provided game, and a game data storage section 274 that stores various types of data, such as table data, required to execute the game. Note that the storage section 270 may have a configuration in which some of these sections are omitted, and some of these sections may be realized by the storage section 140 of the server device 10.

An information storage medium 280 (a computer-readable medium) stores a program, data, and so on, and a function thereof may be realized by an optical disk (a CD or a DVD), a magneto-optical disk (an MO), a magnetic disk, a hard disk, magnetic tape, a memory (a ROM), or the like.

Further, a program that causes a computer to function as the respective sections of this embodiment (a program that causes a computer to execute the processing of the respective sections) may be stored in the information storage medium 280. As will be described below, the processing section 200 performs various types of processing according to this embodiment on the basis of the program (data) stored in the information storage medium 280.

The display section 290 outputs an image generated in accordance with this embodiment, and a function thereof can be realized by a CRT, an LCD, a touch panel display, a head-mounted display (HMD), or the like. Here, a resistive (4-wire or 5-wire) touch panel, a capacitive touch panel, an electromagnetic induction touch panel, an ultrasonic surface acoustic wave touch panel, an infrared scan touch panel, or the like may be used as the touch panel.

A sound output section 292 outputs a sound generated in accordance with this embodiment, and a function thereof can be realized by a speaker, headphones, or the like.

The communication section 296 performs various types of control for communicating with the outside (for example, a host device or another terminal device), and a function thereof can be realized by hardware such as various types of processors or a communication ASIC, a program, or the like.

Note that the terminal device 20 may receive a program and data that are stored in the information storage medium of the server device 10 or the storage section 270 in order to cause a computer to function as the respective sections of this embodiment through a network, and store the received program and data in the information storage medium 280 or the storage section 270. A case in which the terminal device 20 receives a program and data in order to function may also be included within the scope of the invention.

The processing section 200 (a processor) performs game processing, image generation processing, sound generation processing, and so on in conjunction with the server device 10 on the basis of data input from the input section 260, a program, and the like. The game processing includes, for example, processing for starting the game when a game start condition is satisfied, processing for advancing the game, processing for placing an object such as a player object or an enemy object string, processing for displaying the object, processing for calculating a game result, processing for terminating the game when a game termination condition is satisfied, and so on.

Further, the processing section 200 performs various types of processing using the storage section 270 as a work area. A function of the processing section 200 can be realized by hardware such as various types of processors (a CPU, a DSP, or the like) or an ASIC (a gate array or the like), or a program.

Here, the processing section 200 according to this embodiment includes an object space setting section 210, an operation detection processing section 211, a display control section 212, an input reception processing section 213, a game control section 214 (an example of an object control section or mode switching section), a game calculation section 215, a virtual camera control section 216, a game management section 217, a drawing section 220, and a sound processing section 230. The processing section 200 may have a configuration in which some of these sections are omitted.

The object space setting section 210 performs processing for placing, or in other words setting, various objects (objects constituted by a primitive surface such as a sprite, a billboard, a polygon, a free-form surface, or a subdivision surface) representing display items such as an object (a player object, a moving object, an enemy object string (including an enemy character), and so on), a movement path, a building, a tree, a pillar, a wall, or a map (a geographical feature) in an object space.

More specifically, the object space setting section 210 determines a position and a rotation angle (synonymous with an orientation or a direction) of an object (a model object), and places the object in the determined position ((X, Y) or (X, Y, Z)) and at the determined rotation angle (rotation angles about X and Y axes or rotation angles about X, Y, and Z axes).

Here, the object space includes both a so-called virtual two-dimensional space and a so-called virtual three-dimensional space. A two-dimensional space is a space in which an object is placed at two-dimensional coordinates (X, Y), for example, and a three-dimensional space is a space in which an object is placed at three-dimensional coordinates (X, Y, Z), for example.

When the object space is a two-dimensional space, a plurality of objects are placed on the basis of a priority level set for each object. For example, processing may be performed to place the objects in order such that an object (a sprite) that is to appear on a far side is placed first, whereupon objects that are to appear on a near side are placed sequentially so as to overlap the placed object.

Further, by placing an object having a large drawing size on a lower side of an image, and placing an object having a small drawing size on an upper side of the image, an object space corresponding to the upper side of the screen can be made to appear to be on the far side, and an object space corresponding to the lower side of the screen can be made to appear to be on the near side.

Furthermore, when the object space is a three-dimensional space, the objects are placed on a world coordinate system.

The operation detection processing section 211 performs recognition processing for recognizing the input information input by the player using the input section 260. More specifically, the operation detection processing section 211 according to this embodiment receives an instruction input using the input section 260 in relation to each character of the player.

The display control section 212 displays content relating to the game, which is executed on the basis of an instruction input by the player, on the display section 290. For example, the display control section 212 displays a three-dimensional game space, a two-dimensional game space, or the like on the display section 290. The display control section 212 also displays various content, such as a menu on which to execute predetermined game-related setting, on the display section 290 when the game starts, during the game, and when the game ends, for example.

The input reception processing section 213 receives an instruction input by the player using the input section 260, and outputs the received input instruction to the game control section 214 and so on.

The game control section 214 executes game processing based on a command received by the input reception processing section 213. For example, the game control section 214 controls a character (i.e. a player character) to be operated on the basis of the command (i.e. the input instruction) received by the input reception processing section 213, or controls an enemy character or another ancillary character. For example, when the game is a battle game or a shooting game, the game control section 214 executes predetermined processing for attacking the enemy character, providing support such as restoring the power of an ally character, and so on. Further, when the game is a simulation game, the game control section 214 executes a predetermined operation such as crop production or building construction. The game control section 214 also performs movement calculations to calculate such as the movement of a moving body object (in particular, a character object such as a player character or an enemy character) within the object space.

In other words, the game control section 214 performs processing for moving the moving body object within the object space or controlling an operation (motion or animation) of the moving body object on the basis of the data input by the player using the input section 260, a program (a movement algorithm), various data (motion data), and so on.

More specifically, the game control section 214 performs simulation processing for determining movement information (a movement direction, a movement amount, a movement speed, a position, a rotation angle, or an acceleration) and operation information (the position or rotation angle of each partial object) in relation to the object sequentially for each frame. Here, a frame is a unit of time used when implementing movement processing and operation processing (simulation processing) on an object, and image generation processing. In this embodiment, a frame rate may be fixed, or may be varied in accordance with a processing load.

Note that the game control section 214 may also perform processing for moving the object in a three-dimensional object space on the basis of an input direction. For example, a movement direction is associated with each input direction in advance, and the object is moved in the movement direction that corresponds to the input direction.

Moreover, the game control section 214 may execute the above processing in conjunction with the server device 10, or may be formed partially or entirely by the server device 10.

The game calculation section 215 performs various types of game calculation processing. For example, when a plurality of player characters used during the game are set as a deck on the basis of an instruction issued by the player, the game calculation section 215 executes processing for advancing the game using each of the player characters set in the deck. The game calculation section 215 also performs calculation processing required to execute the game, such as forming a predetermined object space for a shooting game, forming an object space based on a map, advancing the game on the basis of a scenario set in advance in response to an operation performed by the player, causing the player object (an operation target object) to battle with the enemy object string or another object (a non-operation target object), and managing parameters during the battle, for example.

Further, the game calculation section 215 manages variable parameters in response to sliding operation input, and displays a result on the display section 290 in the form of a gauge in conjunction with the display control section 212.

Note that the game calculation section 215 executes the above processing in conjunction with the server device 10, but instead, the functions of the game calculation section 215 may be partially or entirely installed in the server device 10.

The virtual camera control section 216 generates an image that is viewed from a given viewpoint so as to appear to have depth. In this case, the virtual camera control section 216 performs processing for controlling a virtual camera (a viewpoint) to generate an image that is viewed from a given (an arbitrary) viewpoint within the object space. More specifically, the virtual camera control section 216 performs processing for controlling a position (X, Y, Z) or a rotation angle (rotational angles about the X, Y, and Z axes) of the virtual camera (processing for controlling the viewpoint position or the sightline direction).

For example, when the object (a character, a ball, or a car, for example) is photographed from behind using the virtual camera, the virtual camera control section 216 controls the position or the rotation angle of the virtual camera (the orientation of the virtual camera) so that the virtual camera follows variation in the position or rotation of the object.

In this case, the virtual camera control section 216 can control the virtual camera on the basis of information about the position, the rotation angle, the speed, or the like of the object, which is obtained by the game control section 214.

Alternatively, the virtual camera control section 216 may perform control for rotating the virtual camera by a predetermined rotation angle or move the virtual camera along a predetermined movement path. In this case, the virtual camera control section 216 controls the virtual camera on the basis of virtual camera data for specifying the position (the movement path) or the rotation angle of the virtual camera.

Note that when a plurality of virtual cameras (viewpoints) exist, the control processing described above is executed on each virtual camera.

The game management section 217 sets the player character and the various items used by each player during the game, which is a battle game or the like, on the basis of an operation input by the player via the input section 260, and registers the player character and the items in the user information 273. When the game is executed using a deck, for example, the game management section 217 registers the set player character and various items in the user information 273 as deck data.

The drawing section 220 performs drawing processing on the basis of the results of the various types of processing (game processing) performed by the processing section 200 in order to generate an image, and outputs the generated image to the display section 290. The image generated by the drawing section 220 may be a so-called two-dimensional image or a so-called three-dimensional image. More specifically, the drawing section 220 generates an image that is viewed from the virtual camera within the object space and is displayed on a screen.

Here, when the drawing section 220 generates two-dimensional images, the drawing section 220 draws the objects in order from the object with the lowest set priority, and in a case where objects overlap, draws an object with a higher priority over an object that has already been drawn.

Further, when the drawing section 220 generates three-dimensional images, first, the drawing section 220 according to this embodiment receives input object data (model data) including vertex data (position coordinates, texture coordinates, color data, a normal vector, an α-value, and so on of a vertex) representing each vertex of the object (model), and then the drawing section 220 performs vertex processing on the basis of the vertex data included in the input object data. Note that the drawing section 220 may, if necessary, perform vertex generation processing (tessellation, curved surface division, or polygon division) for subdividing a polygon when performing the vertex processing.

Further, during the vertex processing, the drawing section 220 performs vertex movement processing and geometric processing such as coordinate transformation (world coordinate transformation or camera coordinate transformation), clipping processing, perspective transformation, or light source processing, and modifies (updates or adjusts) the vertex data given for each of the vertices forming the object on the basis of the processing results. The drawing section 220 then performs rasterization (scan conversion) on the basis of the vertex data subjected to the vertex processing in order to associate a surface of the polygon (the primitive) with pixels. Following rasterization, the drawing section 220 performs pixel processing (fragmenting processing) for drawing the pixels that form the image (fragments that form the display screen).

During the pixel processing, the drawing section 220 determines a final drawing color of each of the pixels forming the image by performing various types of processing such as texture reading (texture mapping), color data setting/modification, translucent blending, and anti-aliasing, and then outputs (draws) the drawing color of the object subjected to perspective transformation to the image buffer 272 (a frame buffer or a buffer capable of storing image information in pixel units; a VRAM or a rendering target). In other words, during the pixel processing, per-pixel processing is implemented to set or modify the image information (the color, the normal, the luminance, the α-value, and so on) in pixel units.

The drawing section 220 thus generates an image that is viewed from the virtual camera (a given viewpoint) set within the object space. Note that when a plurality of virtual cameras (viewpoints) exist, an image may be generated such that images viewed from the respective virtual cameras can be displayed within one screen as divided images.

Note that the vertex processing and pixel processing performed by the drawing section 220 may be realized by hardware known as a so-called programmable shader (a vertex shader or a pixel shader) that enables programmable polygon (primitive) drawing processing by means of a shader program written in a shading language. The programmable shader enables programmable per-vertex unit processing and per-pixel processing, thereby increasing a degree of freedom with respect to the content of the drawing processing and significantly improving representation capability in comparison with fixed hardware drawing processing.

When drawing an object, the drawing section 220 performs geometric processing, texture mapping, hidden surface removal processing, α-blending processing, and so on.

During the geometric processing, the object is subjected to processing such as coordinate transformation, clipping processing, perspective projection transformation, or light source calculation. The drawing section 220 then stores the object data (the vertex position coordinates, texture coordinates, color data (luminance data), normal vector, α-value, or the like of the object) subjected to the geometric processing (subjected to perspective projection transformation) in the storage section 270.

During the texture mapping, processing is performed to map a texture (a texel value) stored in a texture storage section of the storage section 270 onto the object. Specifically, the drawing section 220 reads a texture (surface properties such as color (RGB) and α-value) from the texture storage section of the storage section 270 using the texture coordinates set in (assigned to) each vertex of the object and so on, and maps the texture, which is a two-dimensional image, onto the object. In this case, the drawing section 220 performs pixel-texel association processing, bilinear interpolation as texel interpolation, and so on.

Note that in this embodiment, processing for mapping a given texture may be performed when drawing the object. In this case, a color distribution (a texel pattern) of the texture to be mapped can be varied dynamically.

Further, in this case, a texture having a different color distribution (pixel pattern) may be generated dynamically, or a plurality of textures that differ in color distribution may be prepared in advance and selected for use dynamically. Furthermore, the color distribution of the texture may be varied in object units.

During the hidden surface removal processing, hidden surface removal processing is performed using a Z-buffer method (a depth comparison method or a Z-test) that utilizes a Z-buffer (a depth buffer) storing a Z-value (depth information) of a drawing subject pixel. More specifically, the drawing section 220 refers to the Z-value stored in the Z-buffer when drawing the drawing subject pixel that corresponds to the primitive of the object, and compares the Z-value stored in the Z-buffer with the Z-value of the drawing subject pixel of the primitive. When the Z-value of the drawing subject pixel is a Z-value (a small Z-value, for example) indicating a position on the near side when viewed from the virtual camera, the drawing section 220 implements processing to draw the drawing subject pixel, and updates the Z-value stored in the Z-buffer with a new Z value.

During α-blending, the drawing section 220 performs translucent blending processing (normal α-blending, additive α-blending, subtractive α-blending, or the like) based on the α-value (the A-value). Note that the α-value is information that can be stored in association with each pixel (texel or dot), for example additional information other than the color information. The α-value can be used as mask information, translucency (equivalent to transparency or opacity), bump information, and so on.

The sound processing section 230 performs sound processing on the basis of the results of the various types of processing performed by the processing section 200 in order to generate game sound such as BGM, effect sounds, or voices, and outputs the generated game sound to the sound output section 292.

Note that the terminal device according to this embodiment may implement a system having only a single player mode that allows only one player to play, or may implement a system that also includes a multiplayer mode that allows a plurality of players to play.

Further, when a plurality of players play, the game images and game sound provided to the plurality of players may be generated using a single terminal device 20, or may be generated by distributed processing using a plurality of terminal devices 20 or the server device 10, which are connected by a network (a transmission line or a communication line) or the like.

4. Method of this Embodiment 4-1. Basis of Game 4-1-1. Hardware for Competitive Play The terminal device 20 is capable of executing game processing relating to a battle game. More specifically, the terminal device 20 is capable of enabling competitive play between a plurality of players (to be referred to hereafter as a first player and a second player).

For this purpose, the input section 260 of the terminal device 20 is provided with a first input section 260-1 used by the first player and a second input section 260-2 used by the second player. The first input section 260-1 is used by the first player mainly to control the movement of a first player character, while the second input section 260-2 is used by the second player mainly to control the movement of a second player character.

Further, a non-wearable display (including a projector or the like), for example, that can be viewed simultaneously by the first player and the second player may be employed as the display section 290 of the terminal device 20. Note, however, that the first player and the second player may use individual displays instead. For example, the display section 290 may be a combination of a portable display (a portable display that doubles as the input section, for example) used by the first player and a portable display (a portable display that doubles as the input section, for example) used by the second player. Alternatively, the display section 290 may be a combination of an HMD worn by the first player and an HMD worn by the second player. Hereafter, it is basically assumed that the display section 290 is a single non-wearable display (including a projector or the like) shared by the first player and the second player.

4-1-2. Outline of Competitive Play

Figure 4:
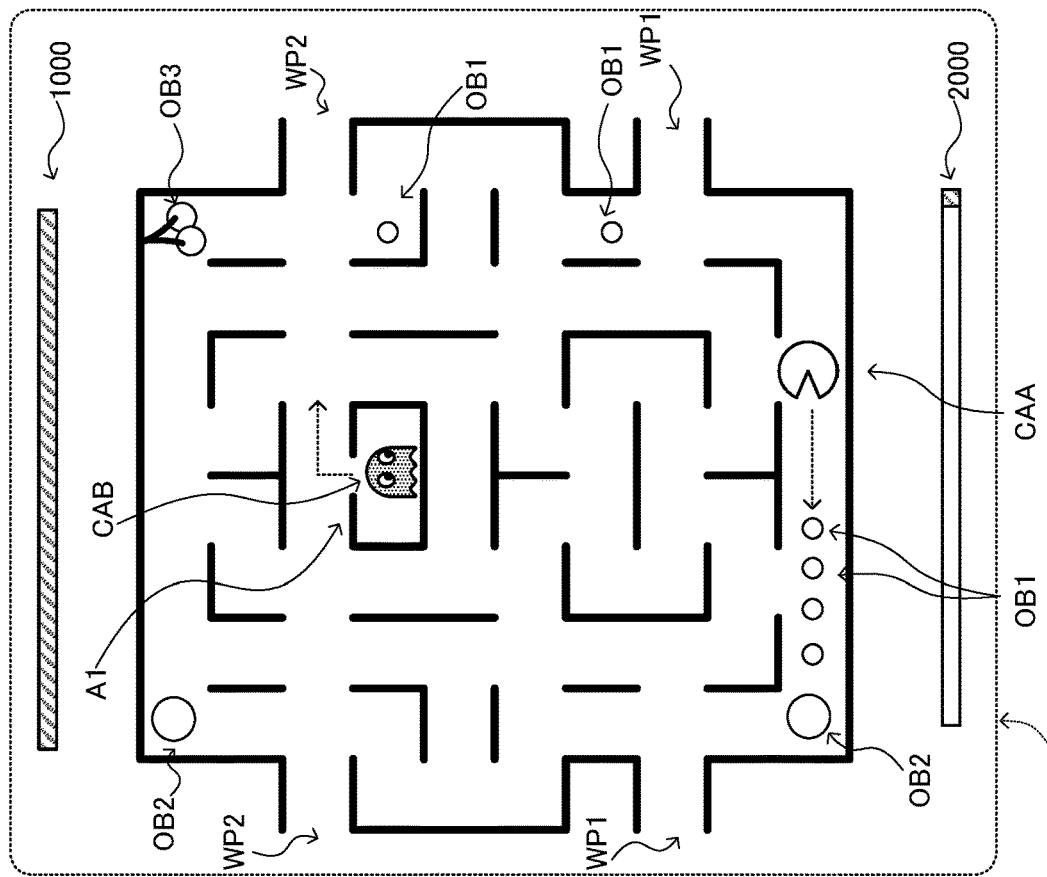
FIG. 4 is a view illustrating an example of a layout of a game screen.
Figure 4:
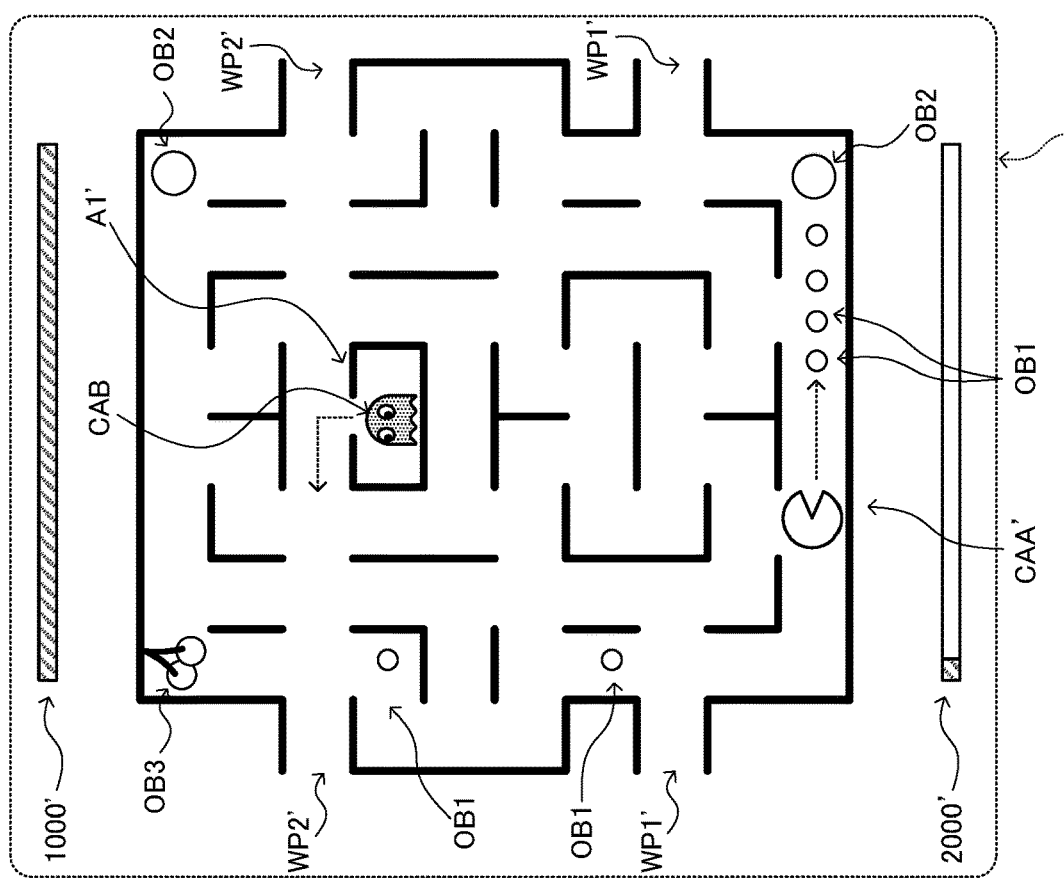

The processing section 200 of the terminal device 20 executes a program (including a first program and a second program to be described below) stored in the information storage medium 280, for example. In accordance with this program, as illustrated in FIG. 4, for example, the processing section 200 allocates a first area 5000 of an object space (a virtual space) having a maze-shaped path delimited by given virtual walls to a first player character CAA that moves under the control of the first player, and allocates a second area 5000' of the virtual space to a second player character CAA' that moves under the control of the second player. The processing section 200 of the terminal device 20 then executes a game in which the first player character CAA and the second player character CAA' compete with each other within the areas 5000, 5000' allocated respectively thereto for progress through the game (a score, a physical strength value, the number of cleared screens, a clearing speed, and so on) while functioning appropriately as the display control section 212, an object control section 214A, the game calculation section 215, a determination section 214B, and an event control section 214C, to be described below.

(1) Display Control Section 212

The display control section 212 executes control for causing the display section 290 to display bird's-eye view images of the path within the first area 5000 and the path within the second area 5000'.

(2) Object Control Section 214A

The object control section 214A executes:

control for placing first items OB1, OB3 that are beneficial to the progress (the score, the physical strength value, the number of cleared screens, the clearing speed, and so on) of the first player character CAA through the game on the path of the first area 5000;

control for placing the first items OB1, OB3 that are beneficial to the progress (the score, the physical strength value, the number of cleared screens, the clearing speed, and so on) of the second player character CAA' through the game on the path of the second area 5000';

control for causing an enemy character CAB that inflicts given damage (a reduction in the physical strength value, a reduction in speed, or the like) on the first player character CAA to appear on the path of the first area 5000 and moving the enemy character CAB by a given algorithm;

control for causing the enemy character CAB that inflicts given damage (a reduction in the physical strength value, a reduction in speed, or the like) on the second player character CAA' to appear on the path of the second area 5000' and moving the enemy character CAB by a given algorithm;

control for placing a second item OB2 that allows the first player character CAA to come into contact with the enemy character CAB (to set the enemy character CAB in a weakened mode) on the path of the first area 5000;

control for placing the second item OB2 that allows the second player character CAA' to come into contact with the enemy character CAB (to set the enemy character CAB in the weakened mode) on the path of the second area 5000';

control for setting the first area 5000 in a condition where the first player character CAA can come into contact with the enemy character CAB (i.e. for setting the enemy character CAB in the weakened mode) when the first player character CAA satisfies a given contact condition with respect to the second item OB2;

control for setting the second area 5000' in a condition where the second player character CAA can come into contact with the enemy character CAB (i.e. for setting the enemy character CAB in the weakened mode) when the second player character CAA' satisfies a given contact condition with respect to the second item OB2;

control for causing the enemy character CAB, the first items OB1, OB3, or the second item OB2 to disappear from the game screen when the first player character CAA satisfies a given contact condition with respect to the enemy character CAB in a contactable condition (in the weakened mode), the first items OB1, OB3, or the second item OB2; and control for causing the enemy character CAB, the first items OB1, OB3, or the second item OB2 to disappear from the game screen when the second player character CAA' satisfies a given contact condition with respect to the enemy character CAB in a contactable condition (in the weakened mode), the first items OB1, OB3, or the second item OB2.

(3) Game Calculation Section 215

The game calculation section 215 executes:

control for reflecting the disappearance status of the enemy character CAB or the first items OB1, OB3 in the first area 5000 on a parameter (a parameter indicating the score, the physical strength value, whether or not a screen has been cleared, or the like) indicating a degree of progress of the first player character CAA through the game; and control for reflecting the disappearance status of the enemy character CAB or the first items OB1, OB3 in the second area 5000' on a parameter (a parameter indicating the score, the physical strength value, whether or not a screen has been cleared, or the like) indicating a degree of progress of the second player character CAA' through the game.

(4) Determination Section 214B

The determination section 214B executes:

processing for determining whether or not a given obstruction triggering condition (to be described below) has been established between the first player character CAA moving along the path through the first area 5000 and the enemy character CAB, the first items OB1, OB3, or the second item OB2; and processing for determining whether or not a given obstruction triggering condition (to be described below) has been established between the second player character CAA' moving along the path through the second area 5000' and the enemy character CAB, the first items OB1, OB3, or the second item OB2.

(5) Event Control Section 214C

The event control section 214C executes:

control for generating, in the second area 5000', an obstruction event (to be described below) for obstructing the progress of the second player character CAA' through the game, when the obstruction triggering condition is established in the first area 5000; and control for generating, in the first area, an obstruction event (to be described below) for obstructing the progress of the first player character through the game, when the obstruction triggering condition is established in the second area 5000'.

According to the configuration described above, when a given obstruction triggering condition is established between the first player character CAA moving along the path of the first area 5000 and the enemy character CAB or the items OB1, OB2, OB3, an obstruction event is generated in the second area 5000', and when a given obstruction triggering condition is established between the second player character CAA' moving along the path of the second area 5000' and the enemy character CAB or the items OB1, OB2, OB3, an obstruction event is generated in the first area 5000.

Hence, even though the path of the first player character CAA and the path of the second player character CAA' are allocated to the different areas 5000, 5000' on the game screen, the first player character CAA and the second player character CAA' have the ability to interfere with each other.

Moreover, basically, the first player can control the timing at which the obstruction event is generated indirectly by controlling a movement pattern of the first player character CAA, and the second player can control the timing at which the obstruction event is generated indirectly by controlling a movement pattern of the second player character CAA'. Therefore, the first player and the second player each have the ability to advance their own progress through the game while acting in parallel to obstruct the other player without the need to execute complicated operations.

Hence, according to the configuration described above, a multiplayer element for competing with an opponent player can be added to a game that includes a battle element in which a first player and a second player chase an enemy character through a maze and escape from the enemy character through the maze in respective home areas thereof, while maintaining the fun of a single player game for battling the enemy character.

4-1-3. Display Screen of Competitive Play

As illustrated in FIG. 4, for example, the display control section 212 of the processing section 200 displays a bird's-eye view image of the path within the first area 5000 and a bird's-eye view image of the path within the second area 5000' side by side on the same display section 290. In this embodiment, a screen on which the first area 5000 and the second area 5000' are displayed side by side will be referred to as the "game screen". On the game screen shown in FIG. 4, the first area 5000 is placed on the right side and the second area 5000' is placed on the left side. Hence, the first player can set an obstruction at an appropriate timing while checking the play of the second player, and the second player can set an obstruction at an appropriate timing while checking the play of the first player. Note that the layout of the first area 5000 and the second area 5000' is not limited to that shown in FIG. 4. For example, one of the first area 5000 and the second area 5000' may be placed on the upper side of the screen and the other on the lower side of the screen.

Furthermore, here, a case in which the first player and the second player use a shared display section 290 (a non-wearable display) is envisaged, but in a case where the first player and the second player use individual display sections 290, the display control section 212 may display similar game screens (see FIG. 4 and so on) on each of the display section 290 of the first player and the display section 290 of the second player. Note that in this case, the game screen displayed to the first player and the game screen displayed to the second player do not have to match each other perfectly. For example, the display control section 212 may reverse the respective layouts of the first area 5000 and the second area 5000' on the game screen displayed to the first player and the first area 5000 and the second area 5000' on the game screen displayed to the second player. Further, for example, the display control section 212 may set the size at which the opponent area (the second area 5000') is displayed on the game screen of the first player to be smaller than the size at which the home area (the first area 5000) is displayed, and set the size at which the opponent area (the first area 5000) is displayed on the game screen of the second player to be smaller than the size at which the home area (the second area 5000') is displayed.

Further, the display control section 212 may perform processing so that the second area 5000' is not displayed on the display section 290 of the first player when the first player does not wish to check the play of the opponent player (i.e. the second player) or the like. Similarly, the display control section 212 may perform processing so that the first area 5000 is not displayed on the display section 290 of the second player when the second player does not wish to check the play of the opponent player (i.e. the first player) or the like.

Note that the processing performed by the display control section 212 may be executed by the display control section 212 alone, or cooperatively with the game control section 214 and so on (likewise hereafter).

4-1-4. Objects in First Area

As shown on the right side of FIG. 4, for example, the display control section 212 of the processing section 200 places virtual walls for limiting movement directions of the character in the first area 5000. In FIG. 4, a plurality of broken lines (segments) depicted by thick lines serve as images of the virtual walls. The virtual walls form a maze-shaped path (a game map) in the first area 5000.

Two points WP1 provided symmetrically at respective ends of the path through the first area 5000 serve as warp points, and the player character CAA can pass (come and go) through these two warp points WP1. Further, two points WP2 provided symmetrically at respective ends of the path through the first area 5000 serve as warp points, and the player character CAA can pass (come and go) through these two warp points WP2.

Furthermore, the display control section 212 places a plurality of the items OB1 individually in respective positions on the path, and places the items OB2, OB3 in predetermined positions on the path. Note that the display control section 212 may cause the items OB2, OB3 to appear as soon as the first area 5000 is displayed, or may wait until the first player character CAA satisfies a predetermined condition (an appearance condition) before causing the items OB2, OB3 to appear.

The display control section 212 then places the enemy character CAB, which moves under the control of the game control section 214, and the first player character CAA, which moves under the control of the first player, on the path of the first area 5000.

Further, when the first player character CAA comes into contact with the item OB1, the display control section 212 deletes the contacted item OB1 from the first area 5000, and when the first player character CAA comes into contact with the items OB2, OB3, the display control section 212 deletes the contacted items OB2, OB3 from the first area 5000. Hence, from the viewpoint of the first player, the first player character CAA appears to eat the items OB1 and the items OB2, OB3.

Furthermore, when the first player character CAA comes into contact with the enemy character CAB while the enemy character CAB is in the weakened mode, to be described below, the display control section 212 deletes the contacted enemy character CAB from the first area 5000, and causes the enemy character CAB to appear in a predetermined area A1 of the first area 5000 in a normal mode, to be described below. Hence, from the viewpoint of the first player, when the first player character CAA eats the enemy character CAB while the enemy character CAB is in the weakened mode, the enemy character CAB appears to be resurrected as the enemy character CAB in the normal mode.

Note that here, "contact" is set as a deletion condition for deleting an object (the enemy character or an item), but "approach" or "contact or approach" may be set as the deletion condition (note that hereafter, the term "contact" may be interpreted as appropriate to mean "contact or approach", wherein "contact or approach" denotes a condition in which a distance (an interval) is no greater than a predetermined threshold and "contact" denotes a condition in which the distance (the interval) is zero). Moreover, the aforesaid contact condition denotes either contact or approach.

4-1-5. Objects in Second Area

As shown on the left side of FIG. 4, for example, the display control section 212 of the processing section 200 places virtual walls for limiting movement directions of the character in the second area 5000'. In FIG. 4, a plurality of broken lines (segments) depicted by thick lines serve as images of the virtual walls. The virtual walls form a maze-shaped path (a game map) in the second area 5000'.

Two points WP1' provided symmetrically at respective ends of the path through the second area 5000' serve as warp points, and the player character CAA' can pass through these two warp points WP1'. Further, two points WP2' provided symmetrically at respective ends of the path through the second area 5000' also serve as warp points, and the player character CAA' can also pass through these two warp points WP2'.

Furthermore, the display control section 212 places a plurality of the items OB1 individually in respective positions on the path, and places the items OB2, OB3 in predetermined positions on the path. Note that the display control section 212 may cause the items OB2, OB3 to appear as soon as the second area 5000' is displayed, or may wait until the second player character CAA' satisfies a predetermined condition (an appearance condition) before causing the items OB2, OB3 to appear.

The display control section 212 then places the enemy character CAB, which moves under the control of the game control section 214, and the second player character CAA', which moves under the control of the second player, on the path of the second area 5000'.

Further, when the second player character CAA' comes into contact with the item OB1, the display control section 212 deletes the contacted item OB1 from the second area 5000', and when the second player character CAA' comes into contact with the items OB2, OB3, the display control section 212 deletes the contacted items OB2, OB3 from the second area 5000'. Hence, from the viewpoint of the second player, the second player character CAA' appears to eat the items OB1 and the items OB2, OB3.

Furthermore, when the second player character CAA' comes into contact with the enemy character CAB while the enemy character CAB is in the weakened mode, to be described below, the display control section 212 deletes the contacted enemy character CAB from the second area 5000', and causes the enemy character CAB to appear in a predetermined area A1' of the second area 5000' in a normal mode, to be described below. Hence, from the viewpoint of the second player, when the second player character CAA' eats the enemy character CAB while the enemy character CAB is in the weakened mode, the enemy character CAB appears to be resurrected as the enemy character CAB in the normal mode.

Note that here, "contact" is set as a deletion condition for deleting an object (the enemy character or an item), but "approach" or "contact or approach" may be set as the deletion condition (note that hereafter, the term "contact"

may be interpreted as appropriate to mean "contact or approach", wherein "contact or approach" denotes a condition in which the distance (the interval) is no greater than a predetermined threshold and "contact" denotes a condition in which the distance (the interval) is zero). Moreover, the aforesaid contact condition denotes either contact or approach.

4-1-6. Movement of Enemy Character in First Area

The game control section 214 of the processing section 200 controls the movement of the enemy character CAB through the first area 5000 in accordance with a predetermined algorithm. Basically, the game control section 214 moves the enemy character CAB along the path through the first area 5000. Therefore, as the number of enemy characters CAB moving along the path through the first area 5000 increases, the proportion of the path occupied by the enemy characters CAB increases, and as a result, the first player character CAA is steadily deprived of movement freedom.

Further, the game control section 214 of the processing section 200 switches a movement mode of the enemy character CAB between two modes, namely the "normal mode" and the "weakened mode", at an appropriate timing. It is assumed here that the timing for switching from the normal mode to the weakened mode corresponds to the timing at which the first player character CAA causes the item OB2 to disappear, while the timing for switching from the weakened mode to the normal mode corresponds to a timing at which a predetermined amount of time has elapsed following the switch from the normal mode to the weakened mode.

Here, to describe the respective modes briefly, the "normal mode" and the "weakened mode" differ from each other in the power of the enemy character CAB over the first player character CAA, the power of the enemy character CAB in the normal mode being higher than the power of the enemy character CAB in the weakened mode. The "power of the enemy character" denotes the ability of the enemy character to cause the player to make a mistake (i.e. to cause the player character CAA to disappear), and can be set using at least one of the following parameters (a), (b), (c), and (d), for example.

(a) The movement speed of the enemy character CAB, i.e. the speed at which the enemy character CAB moves along the path through the first area 5000.

(b) The attack capability of the enemy character CAB, i.e. the ability of the enemy character CAB to inflict damage on the first player character CAA by coming into contact with the first player character CAA.

(c) The movement type (property) of the enemy character, i.e. the type of the movement algorithm. Examples of types of movement algorithms include an escape type for moving in a direction away from the first player character CAA, a chase type for moving in a direction toward the first player character CAA, a random type for moving randomly, and a type for maintaining a predetermined positional relationship with the first player character CAA.

(d) The disappearance likelihood of the enemy character CAB, i.e. the likelihood of the enemy character CAB disappearing from the first area 5000 due to contact with the first player character CAA.

4-1-7. Movement of Enemy Character in Second Area

The game control section 214 of the processing section 200 controls the movement of the enemy character CAB through the second area 5000' in accordance with a predetermined algorithm. Basically, the game control section 214 moves the enemy character CAB along the path through the second area 5000'. Therefore, as the number of enemy characters CAB moving along the path through the second area 5000' increases, the proportion of the path occupied by the enemy characters CAB increases, and as a result, the second player character CAA' is steadily deprived of movement freedom.

Further, the game control section 214 of the processing section 200 switches a movement mode of the enemy character CAB between two modes, namely the "normal mode" and the "weakened mode", at an appropriate timing. It is assumed here that the timing for switching from the normal mode to the weakened mode corresponds to the timing at which the second player character CAA' causes the item OB2 to disappear, while the timing for switching from the weakened mode to the normal mode corresponds to a timing at which a predetermined amount of time has elapsed following the switch from the normal mode to the weakened mode.

Here, to describe the respective modes briefly, the "normal mode" and the "weakened mode" differ from each other in the power of the enemy character CAB over the second player character CAA'. More specifically, the power of the enemy character CAB in the normal mode is higher than the power of the enemy character CAB in the weakened mode. The "power of the enemy character" denotes the ability of the enemy character to cause the player to make a mistake (i.e. to cause the player character CAA' to disappear), and can be set using at least one of the following parameters (a), (b), (c), and (d), for example.

(a) The movement speed of the enemy character CAB, i.e. the speed at which the enemy character CAB moves along the path through the second area 5000'.

(b) The attack capability of the enemy character CAB, i.e. the ability of the enemy character CAB to inflict damage on the second player character CAA' by coming into contact with the second player character CAA'.

(c) The movement type (property) of the enemy character, i.e. the type of the movement algorithm. Examples of types of movement algorithms include an escape type for moving in a direction away from the second player character CAA', a chase type for moving in a direction toward the second player character CAA', a random type for moving randomly, and a type for maintaining a predetermined positional relationship with the second player character CAA'.

(d) The disappearance likelihood of the enemy character CAB, i.e. the likelihood of the enemy character CAB disappearing from the second area 5000' due to contact with the second player character CAA'.

4-1-8. Movement of Enemy Character Through First Area in Each Mode

The game control section 214 sets the power of the enemy character CAB in each of the normal mode and the weakened mode specifically as follows. Note, however, that the following settings are merely examples, and may be modified within a range ensuring that the power relationship between the normal mode and the weakened mode remains intact.

(A) Normal mode: The movement speed of the enemy character CAB is set at a predetermined speed (referred to hereafter as a "normal speed"). Further, the attack capability of the enemy character CAB is set as "existent". Further, the movement type of the enemy character CAB is set at the "random type", for example. Further, the disappearance likelihood of the enemy character CAB is set as "nonexistent". Note here that the movement speed of the enemy character CAB in the normal mode is assumed to be identical to the movement speed of the first player character CAA. In the normal mode (A), the enemy character CAB cannot attack the first player character CAA and the first player character CAA cannot attack the enemy character CAB, and therefore the normal mode may also be referred to as a "standby mode".

(B) Weakened mode: The movement speed of the enemy character CAB is set at a higher speed (referred to hereafter as a "high speed") than the normal speed. Further, the attack capability of the enemy character CAB is set as "nonexistent". Further, the movement type of the enemy character CAB is set at the "escape type". Further, the disappearance likelihood of the enemy character CAB is set as "existent". Note that here, the movement speed of the enemy character CAB in the weakened mode is assumed to be higher than the movement speed of the first player character CAA. In the weakened mode (B), the enemy character CAB cannot attack the first player character CAA, but the first player character CAA can attack the enemy character CAB.

4-1-9. Movement of Enemy Character Through Second Area in Each Mode

The game control section 214 sets the power of the enemy character CAB in each of the normal mode and the weakened mode specifically as follows. Note, however, that the following settings are merely examples, and may be modified within a range ensuring that the power relationship between the normal mode and the weakened mode remains intact.

(A) Normal mode: The movement speed of the enemy character CAB is set at a predetermined speed (referred to hereafter as a "normal speed"). Further, the attack capability of the enemy character CAB is set as "existent". Further, the movement type of the enemy character CAB is set at the "random type", for example. Further, the disappearance likelihood of the enemy character CAB is set as "nonexistent". Note that here, the movement speed of the enemy character CAB in the normal mode is assumed to be identical to the movement speed of the second player character CAA'. In the normal mode (A), the enemy character CAB cannot attack the second player character CAA' and the second player character CAA' cannot attack the enemy character CAB, and therefore the normal mode may also be referred to as a "standby mode".

(B) Weakened mode: The movement speed of the enemy character CAB is set at a higher speed (referred to hereafter as a "high speed") than the normal speed. Further, the attack capability of the enemy character CAB is set as "nonexistent". Further, the movement type of the enemy character CAB is set at the "escape type". Further, the disappearance likelihood of the enemy character CAB is set as "existent". Note that here, the movement speed of the enemy character CAB in the weakened mode is assumed to be higher than the movement speed of the second player character CAA'. In the weakened mode (B), the enemy character CAB cannot attack the second player character CAA', but the second player character CAA' can attack the enemy character CAB.

4-1-10. Movement of First Player Character

The game control section 214 of the processing section 200 controls the movement of the first player character CAA through the first area 5000 in response to an instruction (a command) input from the first player. More specifically, the game control section 214 maintains the movement speed of the first player character CAA through the first area 5000 at a predetermined speed, and varies the movement direction of the first player character CAA through the first area 5000 in response to the command from the first player.

The first player inputs the command through the input section 260-1. The command input by the first player is basically a command specifying the movement direction of the first player character CAA. The command may be a command (an up command) specifying an upward direction on the game screen, a command (a down command) specifying a downward direction on the game screen, a command (a right command) specifying a rightward direction on the game screen, or a command (a left command) specifying a leftward direction on the game screen.

The game control section 214 of the processing section 200 sets the movement direction of the first player character CAA to the upward direction on the game screen when the up command is input through the input section 260-1, sets the movement direction of the first player character CAA to the downward direction on the game screen when the down command is input through the input section 260-1, sets the movement direction of the first player character CAA to the rightward direction on the game screen when the right command is input through the input section 260-1, and sets the movement direction of the first player character CAA to the leftward direction on the game screen when the left command is input through the input section 260-1. Hence, simply by inputting these four commands through the input section 260-1 at appropriate timings, the first player can control the position of the first player character CAA at each timing.

Note that the commands required for the game processing according to this embodiment are basically the four commands described above, and therefore the first player can use a simple component such as a four-way key, a joystick, a keyboard, a lever, a handle, a virtual controller, or the like, for example, or a component having another form as the input section 260-1. For example, when a touch panel is used, a swipe operation in an upward direction of the touch panel, a swipe operation in a downward direction of the touch panel, a swipe operation in a rightward direction of the touch panel, and a swipe operation in a leftward direction of the touch panel may be used as the "up command", the "down command", the "right command", and the "left command", respectively.

4-1-11. Movement of Second Player Character

The game control section 214 of the processing section 200 controls the movement of the second player character CAA' through the second area 5000' in response to an instruction (a command) input from the second player. More specifically, the game control section 214 maintains the movement speed of the second player character CAA' through the second area 5000' at a predetermined speed, and varies the movement direction of the second player character CAA' through the second area 5000' in response to the command from the second player.

The second player inputs the command through the input section 260-2. The command input by the second player is basically a command specifying the movement direction of the second player character CAA'. The command may be a command (an up command) specifying an upward direction on the game screen, a command (a down command) specifying a downward direction on the game screen, a command (a right command) specifying a rightward direction on the game screen, or a command (a left command) specifying a leftward direction on the game screen.

The game control section 214 of the processing section 200 sets the movement direction of the second player character CAA' to the upward direction on the game screen when the up command is input through the input section 260-2, sets the movement direction of the second player character CAA' to the downward direction on the game screen when the down command is input through the input section 260-2, sets the movement direction of the second player character CAA' to the rightward direction on the game screen when the right command is input through the input section 260-2, and sets the movement direction of the second player character CAA' to the leftward direction on the game screen when the left command is input through the input section 260-2. Hence, simply by inputting these four commands through the input section 260-2 at appropriate timings, the second player can control the position of the second player character CAA' at each timing.

Note that the commands required for the game processing according to this embodiment are basically the four commands described above, and therefore the second player can use a simple component such as a four-way key, a joystick, a keyboard, a lever, a handle, a virtual controller, or the like, for example, or a component having another form as the input section 260-2. For example, when a touch panel is used, a swipe operation in an upward direction of the touch panel, a swipe operation in a downward direction of the touch panel, a swipe operation in a rightward direction of the touch panel, and a swipe operation in a leftward direction of the touch panel may be used as the "up command", the "down command", the "right command", and the "left command", respectively.

4-1-12. Game Termination Conditions

First, the determination section 214B cooperates with the game calculation section 215 to manage the physical strength value (HP) of the first player character CAA and the physical strength value (HP) of the second player character CAA' in the user information 273, for example.

At the start of the game, the determination section 214B sets the physical strength value (HP) of the first player character CAA and the physical strength value (HP) of the second player character CAA' at identical values (in a full condition), for example.

Once the game begins, the determination section 214B determines whether or not the first player character CAA has received damage from the enemy character CAB within the first area 5000, and when damage has been received, the determination section 214B subtracts a value corresponding to the damage from the physical strength value of the first player character CAA.

Similarly, once the game begins, the determination section 214B determines whether or not the second player character CAA' has received damage from the enemy character CAB within the second area 5000', and when damage has been received, the determination section 214B subtracts a value corresponding to the damage from the physical strength value of the second player character CAA'.

The determination section 214B then monitors the respective physical strength values (HP) of the first player character CAA and the second player character CAA' in order to determine whether or not the physical strength value (HP) of either thereof has decreased to zero within a time limit, and when the physical strength value (HP) of either the first player character CAA or the second player character CAA' has decreased to zero, the determination section 214B determines that the player character whose physical strength value (HP) is at zero has lost (in other words, determines that the player character whose physical strength value (HP) is not at zero has won).

When, on the other hand, the physical strength value (HP) of neither the first player character CAA nor the second player character CAA' has decreased to zero within the time limit, the determination section 214B determines a draw between the first player character CAA and the second player character CAA'.

After determining that one of the player characters has lost or that the player characters have drawn (i.e. after determining the outcome of the game), the determination section 214B notifies the first player and the second player thereof.

Next, the determination section 214B cooperates with the game calculation section 215 to add a point to the score of the winning player, i.e. the score of the first player or the score of the second player, the scores being held in the user information 273, or to allow the winning player to play on a new game screen (in a new virtual space), or to provide the winning player with a bonus.

Note that here, the first player character CAA and the second player character CAA' compete with each other in terms of the physical strength value (HP), but the player characters may compete with each other in terms of the score, the number of cleared screens, and so on instead of the physical strength value (HP). Furthermore, here, a time limit is provided, but instead of providing a time limit, the competition may be continued until the physical strength value (HP) of one player character reaches zero.

Further, the processing performed by the determination section 214B may be executed by the determination section 214B alone, or cooperatively with at least one of the game calculation section 215, the game management section 217, and the game control section 214 (likewise hereafter).

Furthermore, the determination section 214B may issue a notification by displaying an image through the display section 290, outputting a sound through the sound output section 292, or combining image display with sound output (likewise hereafter).

Moreover, image display through the display section 290 is implemented via the display control section 212, while sound output through the sound output section 292 is implemented via the sound processing section 230 (likewise hereafter).

4-1-13. Physical Strength Gauge

The determination section 214B cooperates with the display control section 212 to display a gauge (a physical strength gauge 1000) indicating the physical strength value of the first player character CAA on the display section 290, and to display a gauge (a physical strength gauge 1000') indicating the physical strength value of the second player character CAA' on the display section 290. As illustrated in FIG. 4, the physical strength gauge 1000 is displayed in or near the display area of the first area 5000, for example, while the physical strength gauge 1000' is displayed in or near the display area of the second area 5000', for example.

The determination section 214B then monitors the respective physical strength values (HP) of the first player character CAA and the second player character CAA' in order to reflect the physical strength value (HP) of the first player character CAA in the value (the gauge length) of the physical strength gauge 1000 and reflect the physical strength value (HP) of the second player character CAA' in the value (the gauge length) of the physical strength gauge 1000'.

Figure 5:
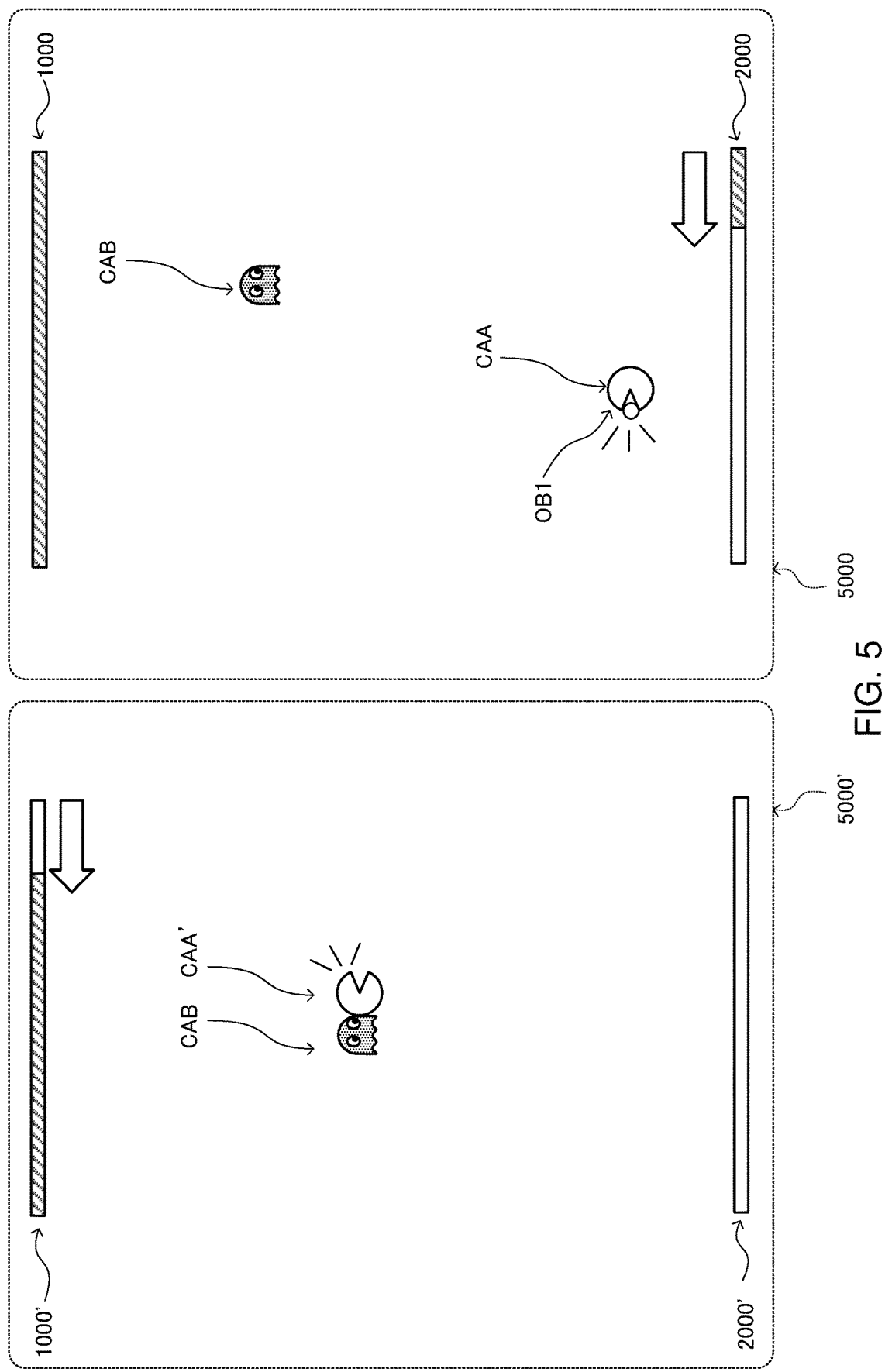
FIG. 5 is a view illustrating an example of a condition in which a first player character CAA causes an item OB1 to disappear and a second player character CAA' contacts an enemy character CAB (virtual walls and the like forming a path are omitted).

Hence, at the start of the game, the respective physical strength gauges 1000 and 1000' are at a maximum length (in a full condition), but when the first player character CAA is damaged during the game, the length of the physical strength gauge 1000 is shortened by an amount corresponding to the received damage, and when the second player character CAA' is damaged during the game, the length of the physical strength gauge 1000' is shortened by an amount corresponding to the received damage. The left side of FIG. 5 shows a condition in which the second player character CAA' has been damaged by being contacted by the enemy character CAB such that the physical strength gauge 1000' of the second player character CAA' is shortened (see the black outlined arrow). Note that the virtual walls have been omitted from FIG. 5 in order to highlight the characters.

When the length of one of the physical strength gauges 1000, 1000' decreases to zero, the first player and the second player are notified that the player character whose physical strength gauge is at zero has lost (in other words, the player character whose physical strength gauge is not at zero has won), and the game is terminated.

Further, when neither of the physical strength gauges 1000, 1000' decreases to zero within the time limit, the first player and the second player are notified that the first player character CAA and the second player character CAA' have drawn, and the game is terminated.

Note that the determination section 214B may cooperate with the display control section 212 to display the score of the first player and the score of the second player, which are held in the user information 273, on the game screen.

Further, the processing performed by the determination section 214B may be executed by the determination section 214B alone, or cooperatively with the display control section 212 (likewise hereafter).

4-1-14. Obstruction Triggering Condition

The determination section 214B determines that the obstruction triggering condition has been established with respect to the second area 5000' when at least one of the following conditions is satisfied.

(1) The enemy character CAB, the first item OB1, OB3, or the second item OB2 is caused to disappear from the first area 5000.

(2) The enemy character CAB, the first item OB1, OB3, or the second item OB2 is caused to disappear from the first area 5000 a predetermined number of times.

(3) The enemy character, the first item, or the second item is caused to disappear from the first area 5000 at a predetermined timing.

(4) The damage inflicted on the enemy character CAB in the first area 5000 reaches a predetermined value.

Further, the determination section 214B determines that the obstruction triggering condition has been established with respect to the first area 5000 when at least one of the following conditions is satisfied.

(1) The enemy character CAB, the first item OB1, OB3, or the second item OB2 is caused to disappear from the second area 5000'.

(2) The enemy character CAB, the first item OB1, OB3, or the second item OB2 is caused to disappear from the second area 5000' a predetermined number of times.

(3) The enemy character, the first item, or the second item is caused to disappear from the second area 5000' at a predetermined timing.

(4) The damage inflicted on the enemy character CAB in the second area 5000' reaches a predetermined value.

According to the configuration described above, the first player can determine whether or not to generate an obstruction event in the second area 5000' or adjust the timing at which the obstruction event is generated by controlling at least one of the disappearance of the enemy character CAB or the items OB1, OB2, OB3 from the first area 5000, the number of disappearances of the enemy character CAB or the items OB1, OB2, OB3, the disappearance timing of the enemy character CAB or the items OB1, OB2, OB3, and the damage inflicted on the enemy character CAB.

Further, the second player can determine whether or not an obstruction event occurs in the first area 5000 or adjust the timing at which the obstruction event is generated by controlling at least one of the disappearance of the enemy character CAB or the items OB1, OB2, OB3 from the second area 5000', the number of disappearances of the enemy character CAB or the items OB1, OB2, OB3, the disappearance timing of the enemy character CAB or the items OB1, OB2, OB3, and the damage inflicted on the enemy character CAB.

It is assumed hereafter that the determination section 214B determines that the obstruction triggering condition is satisfied when "the number of times the items OB1, OB2, OB3 are caused to disappear reaches a predetermined number or the enemy character CAB is caused to disappear".

Accordingly, the determination section 214B cooperates with the game calculation section 215 to monitor a degree to which the first player character CAA has achieved the obstruction triggering condition (an obstruction parameter) and a degree to which the second player character CAA' has achieved the obstruction triggering condition (an obstruction parameter) in the user information 273, for example.

At the start of the game, the determination section 214B sets the degree to which the first player character CAA has achieved the obstruction triggering condition (the obstruction parameter) and the degree to which the second player character CAA' has achieved the obstruction triggering condition (the obstruction parameter) at identical values (zero), for example.

Once the game begins, the determination section 214B determines whether or not any of the enemy character CAB and the items OB1, OB2, OB3 has been caused to disappear from the first area 5000, and when any thereof has been caused to disappear, the determination section 214B adds a value corresponding to the number of items caused to disappear to the degree of achievement (the obstruction parameter) of the first player character CAA.

Similarly, once the game begins, the determination section 214B determines whether or not any of the enemy character CAB and the items OB1, OB2, OB3 has been caused to disappear from the second area 5000', and when any thereof has been caused to disappear, the determination section 214B adds a value corresponding to the number of objects (the enemy character or the items) caused to disappear to the degree of achievement (the obstruction parameter) of the second player character CAA'.

Note that while calculating the degree of achievement (the obstruction parameter), the determination section 214B varies the increase in the degree of achievement in accordance with the type or condition of the object (the enemy character CAB or the items OB1, OB3, OB2) caused to disappear. In this case, the first player can be provided with a motive for actively causing the enemy character or an item that is more advantageous in terms of generating an obstruction event to disappear.

For example, the determination section 214B sets the increase when the item OB2 is caused to disappear to be greater than the increase when the item OB1 is caused to disappear, sets the increase when the item OB3 is caused to disappear to be greater than the increase when the item OB2 is caused to disappear, and sets the increase when the enemy character CAB is caused to disappear to be greater than the increase when the item OB3 is caused to disappear.

Further, for example, the determination section 214B sets the increase in the degree of achievement (the obstruction parameter) in accordance with the mode of the enemy character CAB, a parameter (a parameter such as a fighting strength or a physical strength value, for example) of the enemy character CAB, or the like when the enemy character CAB is caused to disappear. For example, the increase is set to be steadily greater as the fighting strength parameter or the physical strength value parameter increases.

Furthermore, when the object (the enemy character or the item) caused to disappear is the enemy character CAB, the determination section 214B may immediately increase the degree of achievement (the obstruction parameter) to an upper limit value (i.e. such that the obstruction triggering condition is immediately satisfied).

The determination section 214B then monitors the respective degrees of achievement (obstruction parameters) of the first player character CAA and the second player character CAA' in order to determine whether or not the degree of achievement (the obstruction parameter) of one of the player characters has reached the upper limit value (i.e. whether or not the obstruction triggering condition has been satisfied), and when the upper limit value has been reached (when the obstruction triggering condition has been satisfied), the determination section 214B generates an obstruction event in the area of the player character whose degree of achievement has not reached the upper limit value.

Next, the determination section 214B cooperates with the game calculation section 215 to reset the degree of achievement (the obstruction parameter) of the first player character CAA and the degree of achievement (the obstruction parameter) of the second player character CAN, which are held in the user information 273, to zero.

Note that here, when the degree of achievement (the obstruction parameter) of at least one of the first player character CAA and the second player character CAA' reaches the upper limit value, the degree of achievement (the obstruction parameter) of the first player character CAA and the degree of achievement (the obstruction parameter) of the second player character CAA' are both reset, but instead, only the degree of achievement (the obstruction parameter) that has reached the upper limit value may be reset.

4-1-15. Obstruction Gauge

Further, the determination section 214B calculates the degree to which the obstruction triggering condition has been achieved (the obstruction parameter) every time an object (the enemy character CAB or the items OB1, OB3, OB2) is caused to disappear from the first area 5000, and executes control for displaying a visual effect (a gauge, a graph, a virtual meter, or the like) representing the degree of achievement on the display section 290. Similarly, the determination section 214B calculates the degree to which the obstruction triggering condition has been achieved every time an object (the enemy character CAB or the items OB1, OB3, OB2) is caused to disappear from the second area 5000', and executes control for displaying a visual effect (a gauge, a graph, a virtual meter, or the like) representing the degree of achievement on the display section 290. In this case, the first player and the second player can intuitively recognize the number of disappearances remaining until the obstruction event is generated on the basis of the visual effect (the gauge, graph, virtual meter, or the like) displayed on the display section 290.

For example, the determination section 214B cooperates with the display control section 212 to display a gauge (an obstruction gauge 2000) representing the degree of achievement (the obstruction parameter) of the first player character CAA on the display section 290, and to display a gauge (an obstruction gauge 2000') representing the degree of achievement (the obstruction parameter) of the second player character CAA' on the display section 290. As illustrated in FIG. 4, the obstruction gauge 2000 is displayed in or near the display area of the first area 5000, for example, while the obstruction gauge 2000' is displayed in or near the display area of the second area 5000', for example.

Note that the obstruction gauge 2000 may be displayed in or near the display area of the second area 5000'. The reason for this is that although the condition of the obstruction gauge 2000 is determined by past behavior of the first player, the second player refers to the condition of the obstruction gauge 2000 in order to determine future behavior.

Further, the obstruction gauge 2000' may be displayed in or near the display area of the first area 5000. The reason for this is that although the condition of the obstruction gauge 2000' is determined by past behavior of the second player, the first player refers to the condition of the obstruction gauge 2000' in order to determine future behavior.

The determination section 214B then monitors the respective degrees of achievement (obstruction parameters) of the first player character CAA and the second player character CAA' in order to reflect the degree of achievement (the obstruction parameter) of the first player character CAA in the value (the gauge length) of the obstruction gauge 2000 and reflect the degree of achievement (the obstruction parameter) of the second player character CAA' in the value (the gauge length) of the obstruction gauge 2000'.

Hence, at the start of the game, the respective obstruction gauges 2000 and 2000' are at a minimum length (in a zero condition), but when the first player character CAA causes an object (the enemy character or an item) to disappear during the game, the length of the obstruction gauge 2000 is extended by an amount corresponding to the type of the object (the enemy character or an item) caused to disappear, and when the second player character CAA' causes an object (the enemy character or an item) to disappear during the game, the length of the obstruction gauge 2000' is extended by an amount corresponding to the type of the object (the enemy character or an item) caused to disappear. The right side of FIG. 5 shows a condition in which the first player character CAA has caused the item OB1 to disappear, leading to an increase in the length of the obstruction gauge 2000 of the first player character CAA (see the black outlined arrow).

Figure 6:
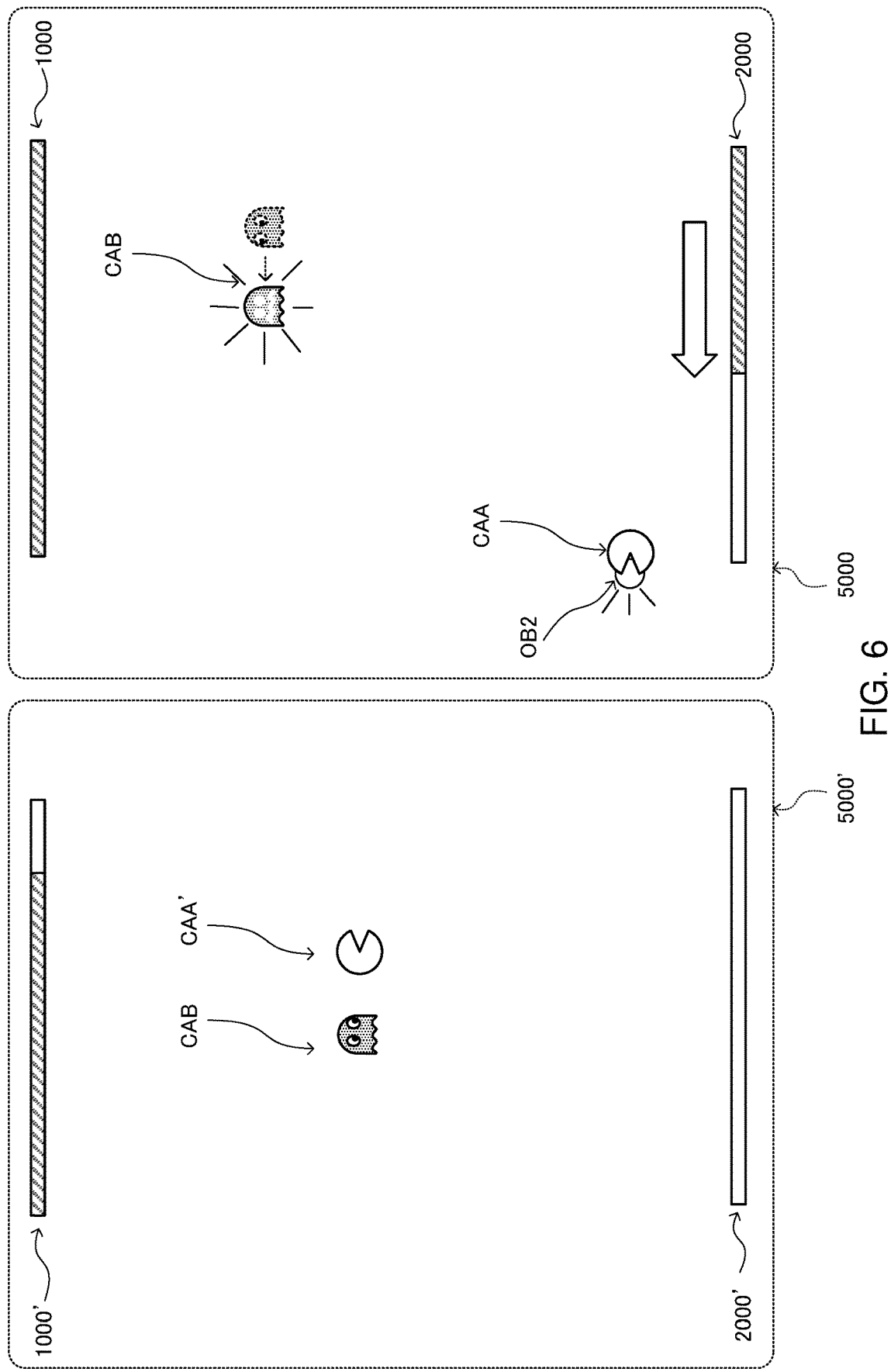
FIG. 6 is a view illustrating an example of a condition in which the first player character CAA causes an item OB2 to disappear such that the enemy character CAB in a second area 5000' shifts to a weakened mode.

The right side of FIG. 6 shows a condition in which the first player character CAA has caused the item OB2 to disappear, thereby altering the mode of the enemy character CAB to the weakened mode at that timing. The disappearance of the item OB2 at this time leads to an increase in the length of the obstruction gauge 2000 of the first player character CAA. Note that the virtual walls have been omitted from FIG. 6 in order to highlight the characters.

When one of the obstruction gauges 2000, 2000' reaches a maximum length, the obstruction event is generated on the path of the virtual space of the player character whose obstruction gauge has not reached the maximum length.

Figure 7:
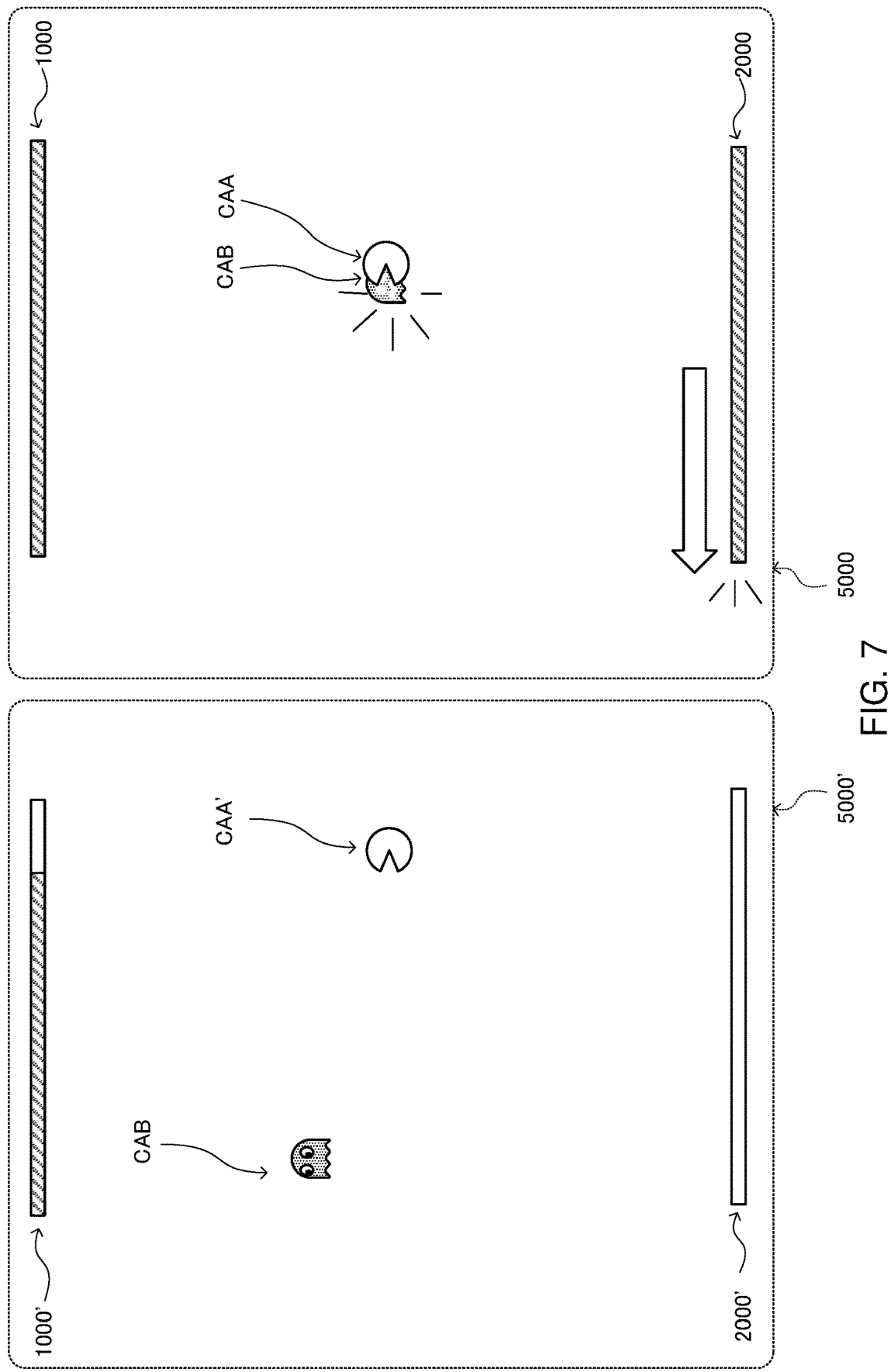
FIG. 7 is a view illustrating an example of a condition in which the first player character CAA causes the enemy character CAB to disappear such that an obstruction condition is established (when a gauge 2000 of an obstruction parameter indicates an upper limit value).

The right side of FIG. 7 shows a condition in which the first player character CAA has caused the enemy character CAB in the weakened mode to disappear, thereby causing the obstruction gauge 2000 of the first player character CAA to reach the maximum length (i.e. a condition in which the obstruction triggering condition is satisfied). Note that the virtual walls have been omitted from FIG. 7 in order to highlight the characters.

The processing performed by the determination section 214B may be executed by the determination section 214B alone, or cooperatively with the display control section 212 (likewise hereafter).

4-1-16. Examples of Obstruction Events

The event control section 214C generates at least one of (11) to (15), described below, as the obstruction event in the second area 5000'.

(11) An obstruction object (the enemy character CAB or a barrage, for example) is introduced into the second area 5000'.

(12) The number of enemy characters CAB or items OB1, OB2, OB3 already existing in the second area 5000' is increased or reduced (for example, the number of enemy characters CAB is increased or the number of items OB1, OB2, OB3 is reduced).

(13) The enemy character CAB or the items OB1, OB2, OB3 already existing in the second area 5000' are altered (for example, the movement algorithm of the enemy character CAB is switched).

(14) The layout of the virtual walls in the second area 5000' is modified (for example, the number of virtual walls is increased or reduced).

(15) The second player character CAA' is altered (for example, when the first player character CAA causes the item OB2 to disappear, the enemy character CAB in the second area 5000' is altered from the weakened mode to the normal mode, the speed of the second player character CAA' is reduced, and so on).

Further, the event control section 214C generates at least one of (21) to (25), described below, as the obstruction event in the first area 5000.

(21) An obstruction object (the enemy character CAB or a barrage, for example) is introduced into the first area 5000.

(22) The number of enemy characters CAB or items OB1, OB2, OB3 already existing in the first area 5000 is increased or reduced (for example, the number of enemy characters CAB is increased or the number of items OB1, OB2, OB3 is reduced).

(23) The enemy character CAB or the items OB1, OB2, OB3 already existing in the first area 5000 are altered (for example, the movement algorithm of the enemy character CAB is switched).

(24) The layout of the virtual walls in the first area 5000 is modified (for example, the number of virtual walls is increased or reduced).

(25) The first player character CAA is altered (for example, when the second player character CAA' causes the item OB2 to disappear, the enemy character CAB in the first area 5000 is altered from the weakened mode to the normal mode, the speed of the first player character CAA is reduced, and so on).

Note that the obstruction event executed on the second area 5000' may include another well-known obstruction event. For example, the visibility of the second area 5000' to the second player may be obstructed. The visibility can be obstructed by darkening the screen, causing the screen to flash, applying a partial mask to the screen, and so on.

Further, the obstruction event executed on the first area 5000 may include another well-known obstruction event. For example, the visibility of the first area 5000 to the first player may be obstructed. The visibility can be obstructed by darkening the screen, causing the screen to flash, applying a partial mask to the screen, and so on.

4-1-17. Examples of Obstruction Objects

The event control section 214C may introduce an obstruction object (the enemy character, a barrage, or the like) into the second area 5000' as at least one of the obstruction events executed on the second area 5000'. The obstruction object includes at least one of the enemy character CAB that inflicts given damage on the second player character CAA', an object (a bomb, a barrage, a landmine, or the like) that inflicts given damage (including a reduction in the speed of the player character) on the path through the second area 5000', and a blocking object that obstructs the passage of the second player character CAA' along the path. Note that here, "introducing an object" is assumed to include an action for displaying an effect image representing introduction of the object on the game screen cooperatively with the display control section 212.

Further, the event control section 214C may introduce an obstruction object (the enemy character, a barrage, or the like) into the first area 5000 as at least one of the obstruction events executed on the first area 5000. The obstruction object includes at least one of the enemy character CAB that inflicts given damage on the first player character CAA, an object (a bomb, a barrage, a landmine, or the like) that inflicts given damage (including a reduction in the speed of the player character) on the path through the first area 5000, and a blocking object that obstructs the passage of the first player character CAA along the path. Note that here, "introducing an object" is assumed to include an action for displaying an effect image representing introduction of the object on the game screen cooperatively with the display control section 212.

Figure 8:
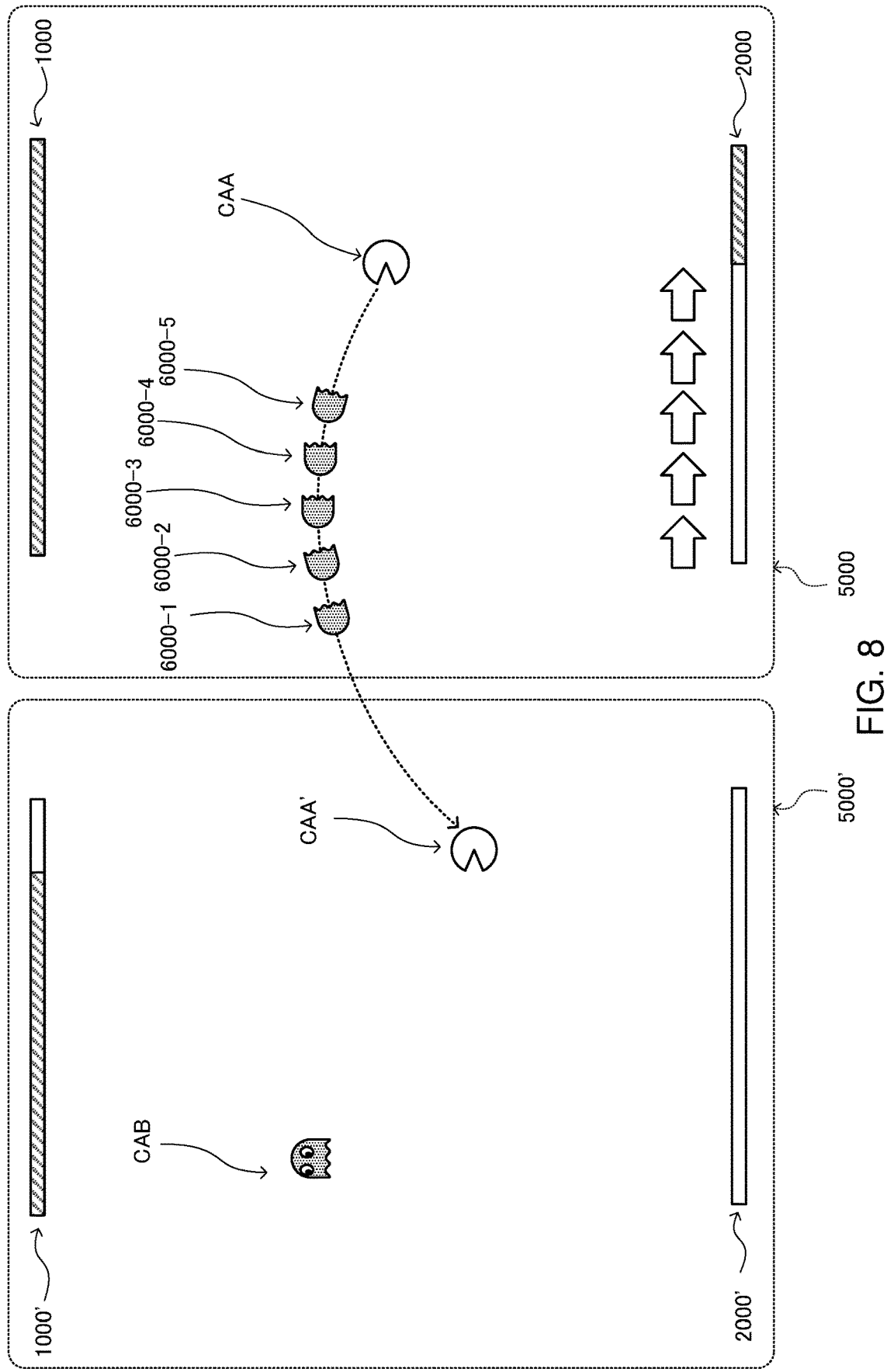
FIG. 8 is a view illustrating an example of an obstruction event (a barrage).

FIG. 8 shows a condition in which a large number of consecutively launched projectile objects 6000-1, 6000-2, 6000-3, 6000-4, 6000-5 (a barrage object) are introduced into the second area 5000' as the obstruction object. When the second player character CAA' comes into contact with any one of the projectile objects 6000-1, 6000-2, 6000-3, 6000-4, 6000-5, damage is inflicted on the second player character CAA' and the movement speed of the second player character CAA' is limited to a low speed for a fixed period (a speed reduction). Note that the virtual walls have been omitted from FIG. 8 in order to highlight the characters.

4-1-18. Introduction Destination and Movement of Obstruction Object

The event control section 214C may introduce the obstruction object toward the area in which the second player character CAA' exists as the obstruction event executed on the second area 5000'. Further, the event control section 214C may introduce the obstruction object toward the area in which the first player character CAA exists as the obstruction event executed on the first area 5000. In this case, the first player can introduce the obstruction object into an area of the second area 5000' that is particularly disadvantageous to the second player, and the second player can introduce the obstruction object into an area of the first area 5000 that is particularly disadvantageous to the first player.

FIG. 8 shows a condition in which the projectile objects 6000-1, 6000-2, 6000-3, 6000-4, 6000-5 are introduced successively from the area in which the first player character CAA exists to the area in which the second player character CAA' exists.

Furthermore, the event control section 214C may link the obstruction object with the movement of the first player character CAA when introducing the obstruction object into the second area 5000', and link the obstruction object with the movement of the second player character CAA' when introducing the obstruction object into the first area 5000. In this case, the first player can control the movement of the obstruction object indirectly by controlling the movement of the first player character CAA when the obstruction triggering condition is established, and the second player can control the movement of the obstruction object indirectly by controlling the movement of the second player character CAA' when the obstruction triggering condition is established. As a result, the first player can use strategy to outmaneuver the second player, and the second player can use strategy to outmaneuver the first player.

Figure 9A:
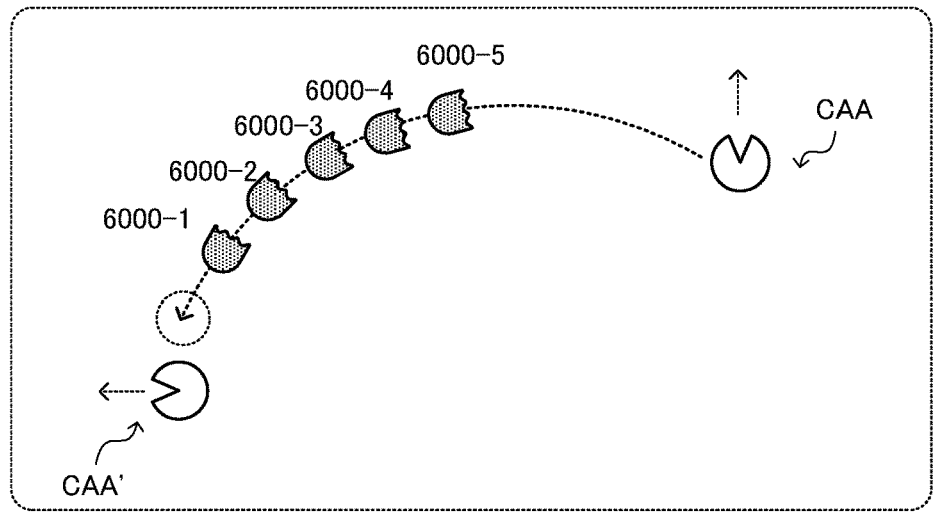
FIGS. 9A to 9C are views illustrating examples of control of a target location of the barrage.

As illustrated in FIG. 9A, for example, when the movement direction of the first player character CAA at the point where the obstruction triggering condition is satisfied is the upward direction of the screen, the introduction destination of the projectile objects 6000-1, 6000-2, 6000-3, 6000-4, 6000-5 is set as an upper side of the area in which the second player character CAA' exists at the point where the obstruction triggering condition is satisfied.

Figure 9B:
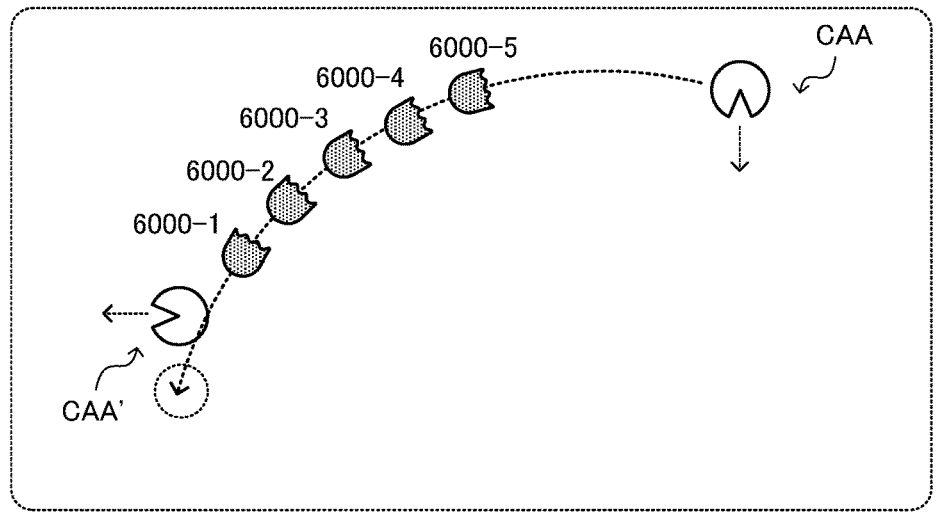

As illustrated in FIG. 9B, when the movement direction of the first player character CAA at the point where the obstruction triggering condition is satisfied is the downward direction of the screen, the introduction destination of the projectile objects 6000-1, 6000-2, 6000-3, 6000-4, 6000-5 is set as a lower side of the area in which the second player character CAN exists at the point where the obstruction triggering condition is satisfied.

Figure 9C:
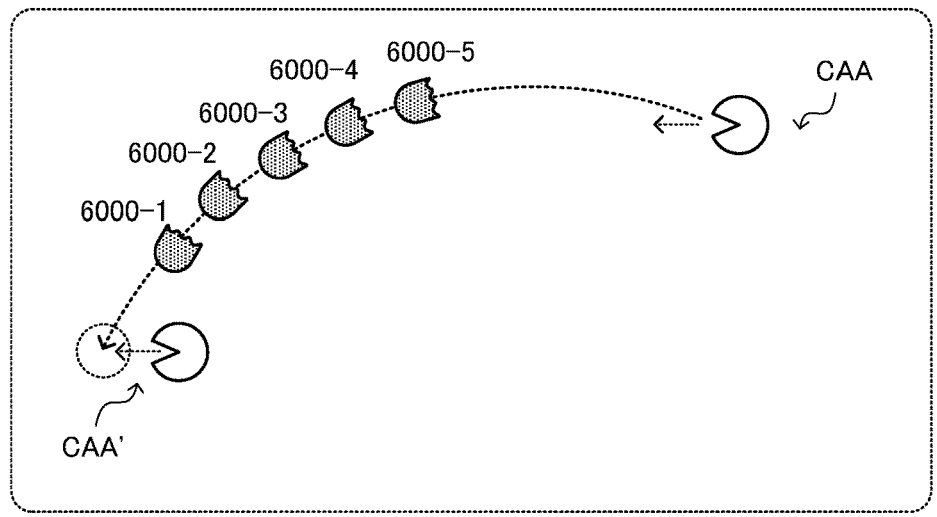

As illustrated in FIG. 9C, when the movement direction of the first player character CAA at the point where the obstruction triggering condition is satisfied is the leftward direction of the screen, the introduction destination of the projectile objects 6000-1, 6000-2, 6000-3, 6000-4, 6000-5 is set as a left side of the area in which the second player character CAN exists at the point where the obstruction triggering condition is satisfied.

Although not shown in the figures, when the movement direction of the first player character CAA at the point where the obstruction triggering condition is satisfied is the rightward direction of the screen, the introduction destination of the projectile objects 6000-1, 6000-2, 6000-3, 6000-4, 6000-5 is set as a right side of the area in which the second player character CAA' exists at the point where the obstruction triggering condition is satisfied. Also note that the virtual walls have been omitted from FIGS. 9A to 9C in order to highlight the characters.

Furthermore, the event control section 214C may introduce the obstruction object toward a predetermined area of the second area 5000' as the obstruction event executed on the second area 5000'. Moreover, the event control section 214C may introduce the obstruction object toward a predetermined area of the first area 5000 as the obstruction event executed on the first area 5000.

As illustrated in FIG. 4, the predetermined area of the second area 5000' is an area of the second area 5000' where the enemy character CAB is waiting, the warp points WP1', WP2', or the like, for example. The warp points WP1', WP2' are locations disposed at a remove from each other within the second area 5000', where the player character CAA' is moved instantaneously to another location.

As illustrated in FIG. 4, the predetermined area of the first area 5000 is an area of the first area 5000 where the enemy character CAB is waiting, the warp points WP1, WP2, or the like, for example. The warp points WP1, WP2 are locations disposed at a remove from each other within the first area 5000, where the player character CAA is moved instantaneously to another location.

Further, when introducing the obstruction object into the second area 5000', the event control section 214C may introduce the obstruction object in accordance with operation input from the first player. Similarly, when introducing the obstruction object into the first area 5000, the event control section 214C may introduce the obstruction object in accordance with operation input from the second player. In this case, the first player can manipulate introduction of the obstruction object into the second area 5000', and the second player can manipulate introduction of the obstruction object into the first area 5000. For example, the first player can be allowed to manipulate at least one of the introduction destination, an introduction angle, and the introduction timing at which the obstruction object is introduced into the second area 5000', and the second player can be allowed to manipulate at least one of the introduction destination, the introduction angle, and the introduction timing at which the obstruction object is introduced into the first area 5000.

Further, the event control section 214C may limit a reception period for the operation input to a predetermined period following establishment of the given condition. In this case, the first player or the second player can be prompted to specify the introduction destination of the obstruction object as quickly as possible. Furthermore, when a touch panel or the like is used for the operation input, the reception period is preferably limited to ensure that the operation input can be differentiated from other operation input.

Moreover, the event control section 214C may link the obstruction object to the movement of the second player character CAN after the obstruction object is introduced into the second area 5000', and link the obstruction object to the movement of the first player character CAA after the obstruction object is introduced into the first area 5000. In this case, the obstruction object chases the second player character CAA', and therefore the second player character CAA' must move continuously or execute avoidance operations such as attracting the obstruction object and then suddenly switching direction to reduce the likelihood of contact with the obstruction object. Similarly, the obstruction object chases the first player character CAA, and therefore the first player character CAA must move continuously or execute avoidance operations such as attracting the obstruction object and then suddenly switching direction to reduce the likelihood of contact with the obstruction object.

Figure 10A:
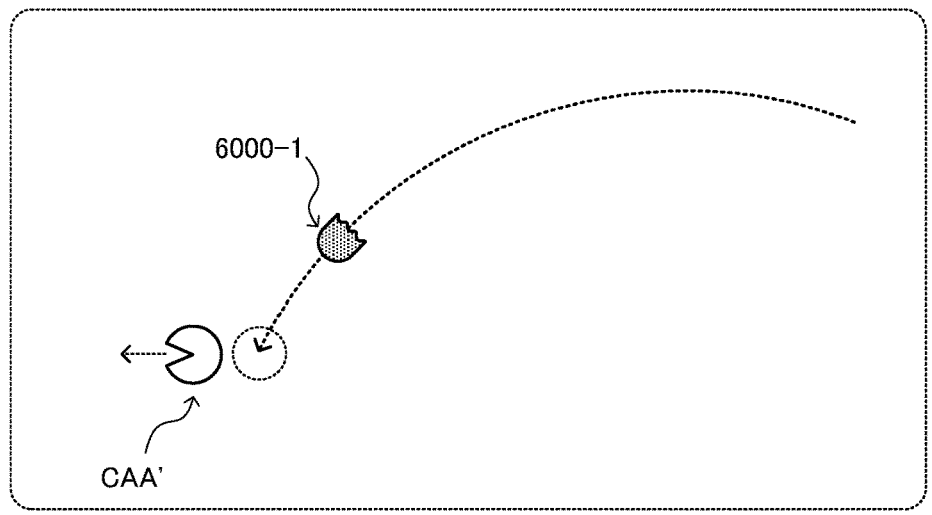
FIGS. 10A to 10C are views illustrating examples of homing control.
Figure 10B:
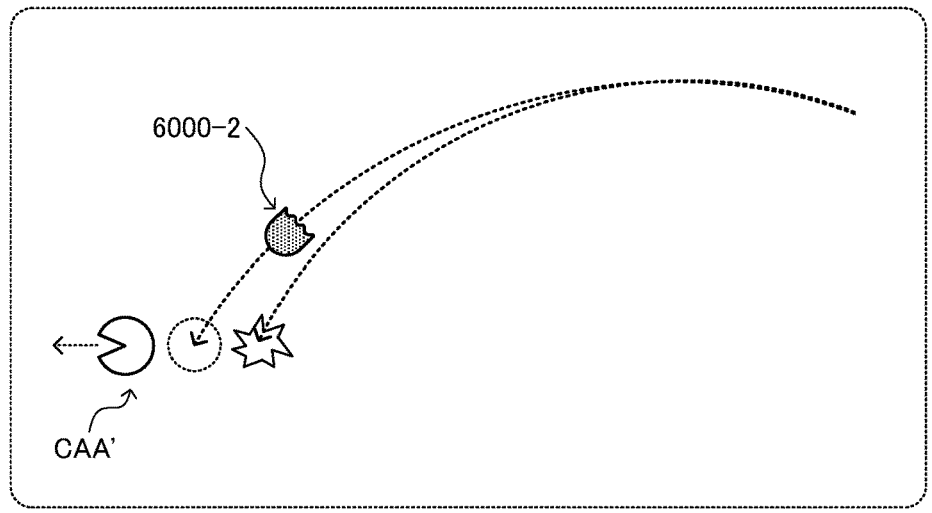
Figure 10C:
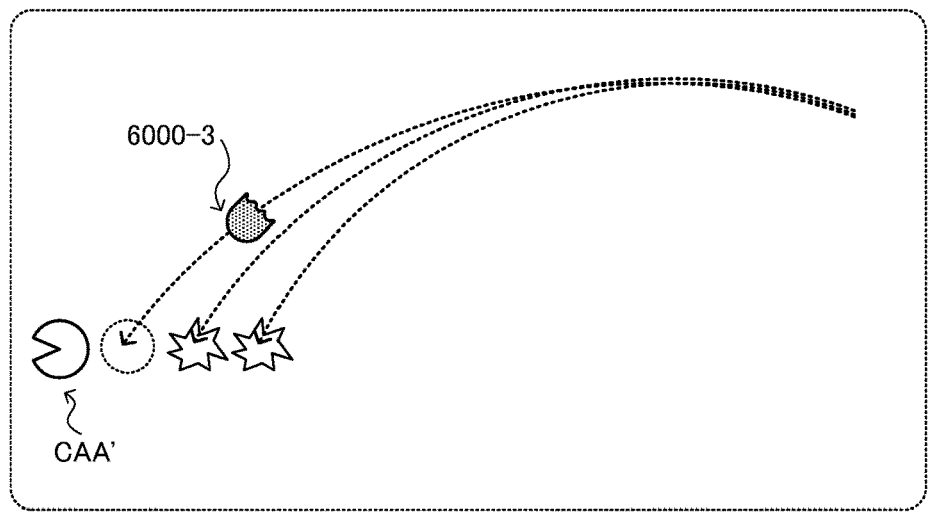

As illustrated in FIG. 10A, FIG. 10B, FIG. 10C, and further, for example, when the movement direction of the second player character CAA' serving as an obstruction target is the leftward direction of the screen, the introduction destination of the first projectile object 6000-1 to be launched, the introduction destination of the second projectile object 6000-2 to be launched, the introduction destination of the third projectile object 6000-3 to be launched, and so on are set to shift gradually leftward so as to chase the second player character CAN serving as the obstruction target. As a result, the projectile objects 6000-1, 6000-2, 6000-3 chase the second player character CAA'. In other words, the barrage constituted by the projectile objects 6000-1, 6000-2, 6000-3 . . . is given a function for homing in weakly on the second player character CAA' serving as the obstruction target. Note that the virtual walls have been omitted from FIGS. 10A to 10C in order to highlight the characters.

Furthermore, the event control section 214C may set the number of obstruction objects introduced into the second area 5000' to be steadily larger as the number of enemy characters CAB, first items OB1, OB3, or second items OB2 that are caused to disappear by the first player character CAA in order to establish the obstruction triggering condition increases, and may set the number of obstruction objects introduced into the first area 5000 to be steadily larger as the number of enemy characters CAB, first items OB1, OB3, or second items OB2 that are caused to disappear by the second player character CAA' in order to establish the obstruction triggering condition increases. In this case, a power difference between the first player character CAA and the second player character CAA' increases steadily as the number of enemy characters CAB or items OB1, OB2, OB3 caused to disappear by the first player character CAA increases, and a power difference between the second player character CAA' and the first player character CAA increases steadily as the number of enemy characters CAB or items OB1, OB2, OB3 caused to disappear by the second player character CAA' increases. As a result, the competitiveness of the game can be improved.

Further, the event control section 214C may set the type (the type, strength, duration, and so on) of the obstruction object introduced into the second area 5000' in accordance with the type (enemy character or item, the type of item, and so on) of the enemy character CAB or item OB1, OB2, OB3 that is caused to disappear by the first player character CAA in order to establish the obstruction triggering condition, and may set the type (the type, strength, duration, and so on) of the obstruction object introduced into the first area 5000 in accordance with the type (enemy character or item, the type of item, and so on) of the enemy character CAB or item OB1, OB2, OB3 that is caused to disappear by the second player character CAA' in order to establish the obstruction triggering condition. In so doing, the first player can select the type of obstruction object to be introduced into the second area 5000' indirectly by selecting the type of enemy character or item to be caused to disappear, and the second player can select the type of obstruction object to be introduced into the first area 5000 indirectly by selecting the type of enemy character or item to be caused to disappear.

Furthermore, the event control section 214C may set the timing at which the obstruction object is introduced into the second area 5000' in accordance with the timing at which the obstruction triggering condition is established in the first area 5000, and may set the timing at which the obstruction object is introduced into the first area 5000 in accordance with the timing at which the obstruction triggering condition is established in the second area 5000'. In so doing, the first player can control the timing at which the obstruction object is introduced into the second area 5000' indirectly by adjusting the timing at which the obstruction triggering condition is established, and the second player can control the timing at which the obstruction object is introduced into the first area 5000 indirectly by adjusting the timing at which the obstruction triggering condition is established. Further, the first player can introduce obstruction objects into the second area 5000' continuously by establishing the obstruction triggering condition continuously, and the second player can introduce obstruction objects into the first area 5000 continuously by establishing the obstruction triggering condition continuously.

4-2. Flow in First Area

Figure 11:
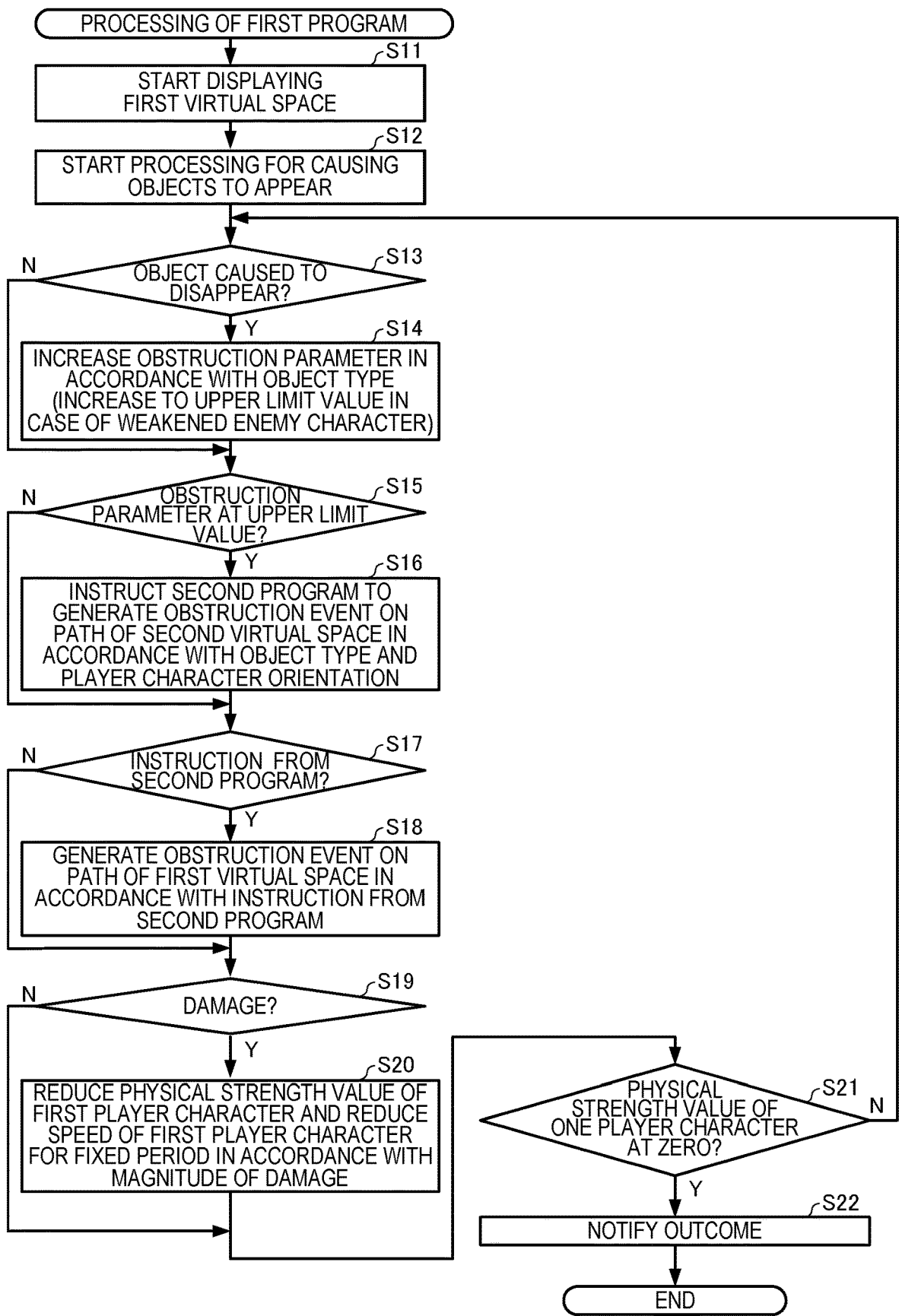
FIG. 11 is a flowchart of an example of processing executed by a first program.

FIG. 11 is a flowchart of an example of the processing executed by the first program.

The first program is written to the information storage medium 280, for example, in order to execute processing in relation to the first area 5000. The first program is essentially executed in the processing section 200 of the terminal device 20. Note, however, that the processing section 200 may execute all or a part of the first program in conjunction with the server device 10. Further, the allocation of functions to the constituent elements of the processing section 200 has already been described above, and therefore, in the following description, the "processing section 200" is assumed to be the agent of the respective steps.

First, when the first program is started, the processing section 200 starts to display the first area 5000 (S11).

Next, the processing section 200 starts processing for causing various objects, including the enemy character CAB, to appear in the first area 5000 (S12).

Next, the processing section 200 determines whether or not any of the objects (the enemy character or an item) has been caused to disappear from the first area 5000 (S13). When one of the objects has been caused to disappear (S13Y), the processing section 200 increases the obstruction parameter of the first player character CAA in accordance with the type of the object caused to disappear (S14), and when none of the objects has been caused to disappear (S13N), the processing section 200 skips the increase processing (S14).

Next, the processing section 200 determines whether or not the obstruction parameter of the first player character CAA has reached the upper limit value (S15). When the obstruction parameter has reached the upper limit value (S15Y), the processing section 200 instructs the second program to generate an obstruction event (S16), and when the obstruction parameter has not reached the upper limit value (S15N), the processing section 200 skips the instruction processing (S16).

It is assumed that the instruction issued to the second program includes information required to specify the content of the obstruction event to be generated in the second area 5000', for example the type and number of the objects caused to disappear from the first area 5000 up to the point at which the obstruction parameter reached the upper limit value, the orientation of the first player character CAA at the timing where the obstruction parameter reached the upper limit value, and so on.

Next, the processing section 200 determines whether or not an instruction has been received from the second program (S17). When an instruction has been received (S17Y), the processing section 200 specifies the obstruction event to be generated in the first area 5000 on the basis of the information included in the instruction from the second program, and generates the obstruction event on the corresponding path of the first area 5000 (S18). When an instruction has not been received (S17N), the processing section 200 skips the generation processing (S18).

Next, the processing section 200 determines whether or not an event that may inflict damage on the first player character CAA has occurred in the first area 5000 (S19). When such an event has occurred (S19Y), the processing section 200 executes processing corresponding to the damage on the first player character CAA (S20). The processing corresponding to the damage is processing for subtracting a value corresponding to the received damage from the physical strength value of the first player character CAA, processing for suppressing the movement speed of the first player character CAA for a fixed period, or the like. When such an event has not occurred (S19N), on the other hand, the processing section 200 skips the damage processing (S20).

Next, the processing section 200 determines whether or not either the physical strength value of the first player character CAA or the physical strength value of the second player character CAA' has reached zero (S21). When one of the physical strength values has reached zero (S21Y), the processing section 200 executes processing for notifying the first player of the outcome (S22), whereupon the flow is terminated. When neither of the physical strength values has reached zero (S21N), on the other hand, the processing section 200 advances to the object disappearance determination processing (S13).

Note that the order of the steps in the flow of FIG. 11 may be switched where possible.

4-3. Flow in Second Area

Figure 12:
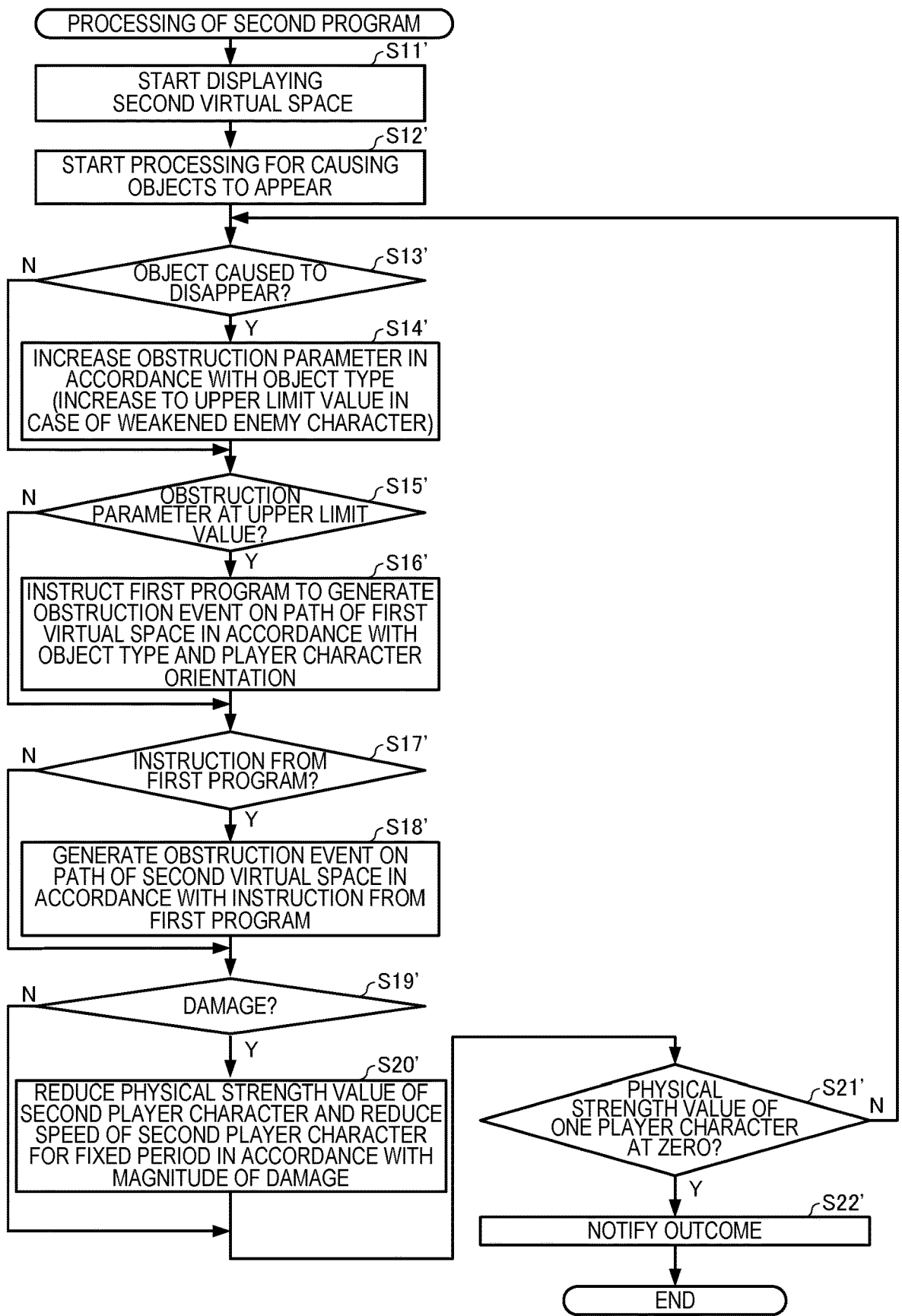
FIG. 12 is a flowchart of an example of processing executed by a second program.

FIG. 12 is a flowchart of an example of the processing executed by the second program.

The second program is written to the information storage medium 280, for example, in order to execute processing in relation to the second area 5000'. The second program is essentially executed in the processing section 200 of the terminal device 20. Note, however, that the processing section 200 may execute all or a part of the second program in conjunction with the server device 10. Further, the allocation of functions to the constituent elements of the processing section 200 has already been described above, and therefore, in the following description, the "processing section 200" is assumed to be the agent of the respective steps. It is assumed that the second program is executed in parallel with the first program.

First, when the second program is started, the processing section 200 starts to display the second area 5000' (S11').

Next, the processing section 200 starts processing for causing various objects, including the enemy character CAB, to appear in the second area 5000' (S12').

Next, the processing section 200 determines whether or not any of the objects (the enemy character or an item) has been caused to disappear from the second area 5000' (S13'). When one of the objects has been caused to disappear (S13'Y), the processing section 200 increases the obstruction parameter of the second player character CAA' in accordance with the type of the object caused to disappear (S14'), and when none of the objects has been caused to disappear (S13'N), the processing section 200 skips the increase processing (S14').

Next, the processing section 200 determines whether or not the obstruction parameter of the second player character CAA' has reached the upper limit value (S15'). When the obstruction parameter has reached the upper limit value (S15'Y), the processing section 200 instructs the first program to generate an obstruction event (S16'), and when the obstruction parameter has not reached the upper limit value (S15'N), the processing section 200 skips the instruction processing (S16').

It is assumed that the instruction issued to the first program includes information required to specify the content of the obstruction event to be generated in the first area 5000, for example the type and number of the objects caused to disappear from the second area 5000' up to the point at which the obstruction parameter reached the upper limit value, the orientation of the second player character CAA' at the timing where the obstruction parameter reached the upper limit value, and so on.

Next, the processing section 200 determines whether or not an instruction has been received from the first program (S17'). When an instruction has been received (S17'Y), the processing section 200 specifies the obstruction event to be generated in the second area 5000' on the basis of the information included in the instruction from the first program, and generates the obstruction event on the corresponding path of the second area 5000' (S18'). When an instruction has not been received (S17'N), the processing section 200 skips the generation processing (S18').

Next, the processing section 200 determines whether or not an event that may inflict damage on the second player character CAA' has occurred in the second area 5000' (S19'). When such an event has occurred (S19'Y), the processing section 200 executes processing corresponding to the damage on the second player character CAA' (S20'). The processing corresponding to the damage is processing for subtracting a value corresponding to the received damage from the physical strength value of the second player character CAA', processing for suppressing the movement speed of the second player character CAA' for a fixed period, or the like. When such an event has not occurred (S19'N), on the other hand, the processing section 200 skips the damage processing (S20').

Next, the processing section 200 determines whether or not either the physical strength value of the second player character CAA' or the physical strength value of the first player character CAA has reached zero (S21'). When one of the physical strength values has reached zero (S21'Y), the processing section 200 executes processing for notifying the second player of the outcome (S22'), whereupon the flow is terminated. When neither of the physical strength values has reached zero (S21'N), on the other hand, the processing section 200 advances to the object disappearance determination processing (S13').

Note that the order of the steps in the flow of FIG. 12 may be switched where possible.

5. Actions and Effects of this Embodiment

As described above, in the game described above, an obstruction event is generated in the second area 5000' when the first player character CAA moving along the path of the first area 5000 establishes a given obstruction triggering condition with the enemy character CAB or the items OB1, OB2, OB3, and an obstruction event is generated in the first area 5000 when the second player character CAA' moving along the path of the second area 5000' establishes a given obstruction triggering condition with the enemy character CAB or the items OB1, OB2, OB3. Hence, even though the path of the first player character CAA and the path of the second player character CAA' are allocated to different areas 5000, 5000', the first player character CAA and the second player character CAA' can interfere with each other. Moreover, basically, the first player can control the timing at which the obstruction event is generated indirectly by controlling the movement pattern of the first player character CAA, and the second player can control the timing at which the obstruction event is generated indirectly by controlling the movement pattern of the second player character CAA'. Therefore, the first player and the second player each have the ability to advance their own progress through the game while acting in parallel to obstruct the other player without the need to execute complicated operations.

Hence, according to the configuration described above, a multiplayer element for competing with an opponent player can be added to a game that includes a battle element in which a first player and a second player chase an enemy character through a maze and escape from the enemy character through the maze in respective home areas thereof, while maintaining the fun of a single player game for battling the enemy character.

6. Modified Examples 6-1. Computer Competition

The terminal device 20 described above executes a game in which the first player character CAA and the second player character CAA' compete with each other, but instead, a computer (the game control section 214) may control one of the player characters.

6-2. Ghost Competition

Further, the terminal device 20 described above may store a play history (or an operation history) of one of the competing player characters, among the first player character CAA and the second player character CAA', in the storage section 270 or the like, and reproduce the play of that player character on the basis of the stored play history (or operation history) at a subsequent timing while competing with the other player character. Similarly, the terminal device 20 may be configured such that a certain player can compete against a past self.

6-3. Screen Clearance

When the first area 5000 is cleared (for example, when all of the items OB1, OB2 appearing in the first area 5000 have disappeared), the game control section 214 may allow the first player character CAA to play in a new first area while continuing to compete in terms of the physical strength value.

When the second area 5000' is cleared (for example, when all of the items OB1, OB2 appearing in the second area 5000' have disappeared), the game control section 214 may allow the second player character CAA' to play in a new second area while continuing to compete in terms of the physical strength value.

In this case, the game control section 214 may set a difficulty level of the new virtual space to be higher than the difficulty level of the previous virtual space, or set an increase rate of the obstruction parameter in the new virtual space to be higher than the increase rate of the obstruction parameter in the previous virtual space. In so doing, opportunities for the player to obstruct the opponent side can be increased as the number of cleared screens increases. Note that the difficulty level of the virtual space is increased by, for example, increasing the movement speed of the enemy character appearing in the virtual space, removing the virtual walls, increasing the number of enemy characters, and so on.

Further, the game control section 214 may cause an identical enemy character to the enemy character appearing on the previous game screen to appear on the new game screen. Furthermore, the power of the enemy character in the new virtual space may be increased above the power of the enemy character in the previous virtual space.

6-4. Other Gauges

The determination section 214B may cooperate with the display control section 212 to display an amount of time remaining until the movement of the enemy character CAB in the first area 5000 shifts from the weakened mode to the normal mode in or near the first area 5000. Display of the remaining time is expressed using a gauge (not shown), for example.

The determination section 214B may cooperate with the display control section 212 to display an amount of time remaining until the movement of the enemy character CAB in the second area 5000' shifts from the weakened mode to the normal mode in or near the second area 5000'. Display of the remaining time is expressed using a gauge (not shown), for example.

Alternatively, the determination section 214B may cooperate with the display control section 212 to display an amount of time remaining until the time limit expires on the game screen. Display of the remaining time is expressed using a gauge (not shown), for example.

6-5. Function Apportionment

Function apportionment to the respective elements included in the processing section 200 is not limited to that described above. For example, the functions of any elements among the display control section 212, the determination section 214B, the event control section 214C, the game management section 217, and the game calculation section 215 may be installed in one or a plurality of other elements. Further, dedicated circuits (hardware) for realizing some or all of the functions of the processing section 200 may be installed in the terminal device 20. Furthermore, some or all of the functions of the terminal device 20 may be installed in the server device 10.

6-6. Communicative Competition

In the system described above, a situation in which the first player and the second player compete with each other using the shared terminal device 20 was envisaged, but the system may be configured such that the first player and the second player can compete with each other through communication via the server device 10.

For example, a terminal device 20A shown in FIG. 1 may provide the first player with a game relating to the first area 5000 on the basis of data distributed thereto from the server device 10, and a terminal device 20B shown in FIG. 1 may provide the second player with a game relating to the second area 5000' on the basis of data distributed thereto from the server device 10.

In this case, the display section 290 of the terminal device 20A may display the second area 5000' together with the first area 5000, and the display section 290 of the terminal device 20B may display the first area 5000 together with the second area 5000'. In so doing, the first player and the second player can check each other's play, and more fully enjoy using strategy.

6-7. Competition Through Direct Communication

Further, the terminal device 20A and the terminal device 20B shown in FIG. 1 may communicate with each other directly by short-range wireless communication or the like, for example, rather than passing through the server device 10 such that the terminal device 20A provides the first player with the game and the terminal device 20B provides the second player with the game. In this case, the terminal device 20A may execute the first program and the terminal device 20B may execute the second program while the terminal devices 20A, 20B communicate with each other. Further, the terminal devices 20A, 20B may exchange data for displaying the first area on the display section 290 and data for displaying the second area on the display section 290 as required. In this case, the display section 290 of the terminal device 20A can display the second area 5000' together with the first area 5000, and the display section 290 of the terminal device 20B can display the first area 5000 together with the second area 5000'.

7. Other

The invention is not limited to the embodiments described above. Various modifications and variations may be made of the embodiments. Any term cited with a different term having a broader meaning or the same meaning at least once in the specification and the drawings may be replaced by the different term in any place in the specification and the drawings.

For example, in the above embodiments, each game may be provided to the terminal device 20 using a single server device 10, or a server system may be implemented by a plurality of server devices 10 that operate in synchronization, and each game may be provided to the terminal device 20 using the server system.

Further, in the above embodiments, the game provided by the server device 10 is executed by the terminal device 20, but instead, the respective functions of the processing section 200 of the terminal device 20, except for the operation detection processing section 211, and the game program may be executed by the server device 10, and the terminal device 20 may implement the game by means of operation input and streaming image display.

Furthermore, in the above embodiment, the terminal device according to the invention is applied to a game device, but the terminal device according to the invention is not limited to a game device, and may be applied to any terminal device that allows a user to input operations using a touch panel of a smartphone, a tablet-type information terminal device, a personal computer, a monitor, a television, or the like.

The invention includes configurations that are substantially identical to the configurations described in the embodiments (for example, configurations having identical functions, methods, and results or configurations having identical objectives and effects). The invention also includes configurations in which non-essential elements described in the embodiments are replaced by other elements. The invention also includes configurations having the same actions and effects as those of the configurations described in the embodiments, or configurations with which identical objectives can be achieved. Furthermore, the invention includes configurations in which known techniques are added to the configurations described in the embodiments.

Some embodiments of the invention were described in detail above, but a person skilled in the art would readily appreciate that many modifications are possible in the embodiments without materially departing from the novel teachings and advantages of the invention. Accordingly, all such modifications are assumed to be included in the scope of the invention.

What is claimed is:

1. A non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to to perform steps comprising:
   causing a display to display a bird's-eye view image of the path within the first area;
   providing a first item that is beneficial to the game progress by the first player character on the path within the first area;
   causing an enemy character that inflicts given damage on the first player character to appear on the path within the first area, and moving the enemy character by a given algorithm;
   providing a second item that allows the first player character to come into contact with the enemy character on the path within the first area;
   setting the first area in a condition where the first player character can come into contact with the enemy character when the first player character satisfies a given contact condition with respect to the second item;
   causing the enemy character, the first item, or the second item to disappear when the first player character satisfies a given contact condition with respect to the enemy character in a contactable condition, the first item, or the second item;
   calculating a disappearance status of the enemy character or the first item in the first area on a parameter indicating a degree of the game progress by the first player character;
   determining whether or not a given obstruction triggering condition has been established by the first player character moving along the path within the first area with respect to the enemy character, the first item, or the second item; and
   generating, in the second area, an obstruction event for obstructing the game progress by the second player character when the obstruction triggering condition is established in the first area, the obstruction event including at least one of: (i) modifying a layout of virtual walls in the second area, and (ii) altering the second player character.

2. The information storage medium as defined in claim 1, further comprising:
   displaying the bird's-eye view image of the path within the first area and a bird's-eye view image of a path within the second area side by side on the same display.

3. The information storage medium as defined in claim 1, wherein
   the given obstruction triggering condition is satisfied based on at least one of the following conditions:
      the enemy character, the first item, or the second item has been caused to disappear;
      the number of disappearances of the enemy character, the first item, or the second item has reached a predetermined number;
      a disappearance timing of the enemy character, the first item, or the second item is a predetermined timing; and
      damage inflicted on the enemy character has reached a predetermined value.

4. The information storage medium as defined in claim 3, further comprising:
   determining whether or not the number of disappearances of the enemy character, the first item, or the second item has reached the predetermined number as the given obstruction triggering condition,
   calculating a degree of achievement of the given obstruction triggering condition every time the enemy character, the first item, or the second item disappears, and
   displaying a visual effect representing the degree of achievement on the display.

5. The information storage medium as defined in claim 4, wherein, when calculating the degree of achievement, an increase in the degree of achievement varies in accordance with a type or a condition of the enemy character, the first item, or the second item.

6. The information storage medium as defined in claim 1, wherein the obstruction event further includes:
   introducing an obstruction object into the second area;
   increasing or reducing the number of enemy characters or items already existing in the second area; and
   altering an enemy character or an item already existing in the second area.

7. The information storage medium as defined in claim 6, further comprising:
   providing an obstruction object into the second area as the obstruction event, the obstruction object including at least one of:
      an enemy character that inflicts given damage on the second player character;
      an object that inflicts given damage on the path; and
      a blocking object that obstructs passage along the path.

8. The information storage medium as defined in claim 7, further comprising:
providing the obstruction object toward an area in which the second player character exists.

9. The information storage medium as defined in claim 7, further comprising:
linking the obstruction object to movement of the first player character.

10. The information storage medium as defined in claim 7, further comprising:
providing the obstruction object toward a predetermined area within the second area.

11. The information storage medium as defined in claim 7, further comprising:
providing the obstruction object in response to operation input by the first player.

12. The information storage medium as defined in claim 11, further comprising:
limiting a reception period for the operation input to a predetermined period following establishment of the given obstruction triggering condition.

13. The information storage medium as defined in claim 7, further comprising:
linking the obstruction object to movement of the second player character.

14. The information storage medium as defined in claim 7, further comprising:
setting the number of obstruction objects to be steadily higher as the number of enemy characters, first items, or second items caused to disappear by the first player character in order to establish the given obstruction triggering condition increases.

15. The information storage medium as defined in claim 7, further comprising:
setting a type of the obstruction object in accordance with the type of the enemy character or the item that is caused to disappear by the first player character in order to establish the given obstruction triggering condition.

16. The information storage medium as defined in claim 7, further comprising:
setting an introduction timing of the obstruction object in accordance with a timing at which the given obstruction triggering condition is established.

17. A non-transitory computer-readable information storage medium storing a program that causes a computer to implement a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the program causing the computer to perform steps comprising:
causing a display to display bird's-eye view images of the path within the first area and a path within the second area;
providing a first item that is beneficial to the game progress by the first player character on the path within the first area;
providing a second item that is beneficial to the game progress by the second player character on the path within the second area;
causing a first enemy character that inflicts given damage on the first player character to appear on the path within the first area, and moving the first enemy character by a given algorithm;
causing a second enemy character that inflicts given damage on the second player character to appear on the path within the second area, and moving the second enemy character by a given algorithm;
providing a third item that allows the first player character to come into contact with the first enemy character on the path within the first area;
providing a fourth item that allows the second player character to come into contact with the second enemy character on the path within the second area;
setting the first area in a condition where the first player character can come into contact with the first enemy character when the first player character satisfies a given contact condition with respect to the third item;
setting the second area in a condition where the second player character can come into contact with the second enemy character when the second player character satisfies a given contact condition with respect to the fourth item;
causing the first enemy character, the first item, or the third item to disappear when the first player character satisfies a given contact condition with respect to the first enemy character in a contactable condition, the first item, or the third item;
causing the second enemy character, the second item, or the fourth item to disappear when the second player character satisfies a given contact condition with respect to the second enemy character in a contactable condition, the second item, or the fourth item;
calculating a disappearance status of the first enemy character or the first item in the first area on a parameter that indicates a degree of the game progress by the first player character;
calculating a disappearance status of the second enemy character or the second item in the second area on a parameter that indicates a degree of the game progress by the second player character;
determining whether or not a given obstruction triggering condition has been established by the first player character moving along the path within the first area with respect to the first enemy character, the first item, or the third item;
determining whether or not a given obstruction triggering condition has been established by the second player character moving along the path within the second area with respect to the second enemy character, the second item, or the fourth item;
generating, in the second area, an obstruction event for obstructing the game progress by the second player character, when the obstruction triggering condition is established in the first area; and
generating, in the first area, an obstruction event for obstructing the game progress by the first player character, when the obstruction triggering condition is established in the second area, the obstruction event including at least one of: (i) modifying a layout of virtual walls in the second area, and (ii) altering the second player character.

18. A game device that executes a game in which a first area of a virtual space that includes a maze-shaped path delimited by given virtual walls is allocated to a first player character that moves under the control of a first player, a second area of the virtual space is allocated to a second player character that moves under the control of a second player, and the first player character and the second player character compete for game progress in the respective areas allocated thereto, the game device comprising:

a display configured to display a bird's-eye view image of the path within the first area; and a processor programmed to:

provide a first item that is beneficial to the game progress by the first player character on the path within the first area, cause an enemy character that inflicts given damage on the first player character to appear on the path within the first area, and moving the enemy character by a given algorithm, provide a second item that allows the first player character to come into contact with the enemy character on the path within the first area, set the first area in a condition where the first player character can come into contact with the enemy character when the first player character satisfies a given contact condition with respect to the second item, cause the enemy character, the first item, or the second item to disappear when the first player character satisfies a given contact condition with respect to the enemy character in a contactable condition, the first item, or the second item;

calculate a disappearance status of the enemy character or the first item in the first area on a parameter indicating a degree of the game progress by the first player character, determine whether or not a given obstruction triggering condition has been established by the first player character moving along the path within the first area with respect to the enemy character, the first item, or the second item, and generate, in the second area, an obstruction event for obstructing the game progress by the second player character, when the obstruction triggering condition is established in the first area, the obstruction event including at least one of: (i) modifying a layout of virtual walls in the second area, and (ii) altering the second player character.

* * * * *

UNITED STATES PATENT AND TRADEMARK OFFICE
CERTIFICATE OF CORRECTION

PATENT NO. : 10,610,784 B2
APPLICATION NO. : 15/847130
DATED : April 7, 2020
INVENTOR(S) : Toru Takahashi et al.

Page 1 of 1

It is certified that error appears in the above-identified patent and that said Letters Patent is hereby corrected as shown below:

In the Claims

In Claim 1, at Column 47, Line 46:
"the computer to to perform steps comprising"
Should be:
-- the computer to perform steps comprising --.

Signed and Sealed this
Seventh Day of July, 2020

Andrei Iancu
*Director of the United States Patent and Trademark Office*